(12) United States Patent
Dejanovic

(10) Patent No.: US 11,405,323 B2
(45) Date of Patent: Aug. 2, 2022

(54) METHOD AND NETWORK DEVICE FOR FORWARDING DATA PACKETS

(71) Applicant: Arista Networks, Inc., Santa Clara, CA (US)

(72) Inventor: Thomas Dejanovic, Sydney (AU)

(73) Assignee: Arista Networks, Inc., Santa Clara, CA (US)

( * ) Notice: Subject to any disclaimer, the term of this patent is extended or adjusted under 35 U.S.C. 154(b) by 34 days.

(21) Appl. No.: 16/754,279

(22) PCT Filed: Oct. 17, 2018

(86) PCT No.: PCT/AU2018/000200
§ 371 (c)(1),
(2) Date: Apr. 7, 2020

(87) PCT Pub. No.: WO2019/075505
PCT Pub. Date: Apr. 25, 2019

(65) Prior Publication Data
US 2020/0314021 A1    Oct. 1, 2020

(30) Foreign Application Priority Data
Oct. 17, 2017  (AU) .............................. 2017904205

(51) Int. Cl.
*H04L 47/32* (2022.01)
*H04L 47/2441* (2022.01)
(Continued)

(52) U.S. Cl.
CPC .......... *H04L 47/32* (2013.01); *H04L 47/2441* (2013.01); *H04L 47/50* (2013.01); *H04W 28/0278* (2013.01)

(58) Field of Classification Search
None
See application file for complete search history.

(56) References Cited

U.S. PATENT DOCUMENTS 8,018,958 B1 *   9/2011   Johnson .............. H04L 47/6255
                                                          370/401
8,179,792 B1 *   5/2012   Doerr ...................... H04L 47/10
                                                          370/230

(Continued)

OTHER PUBLICATIONS

International Search Report and Written Opinion issued in corresponding Application No. PCT/AU2018/000200, dated Feb. 13, 2019 (9 pages).

*Primary Examiner* — Anh Ngoc M Nguyen
(74) *Attorney, Agent, or Firm* — Chamberlain, Hrdlicka, White, Williams & Aughtry

(57) ABSTRACT

A method and network device for forwarding data packets. Specifically, the method and network device disclosed herein separate the known data packet forwarding architecture in network devices, often implemented using a single component, into two components. In implementing the pair of components, functionalities directed to forwarding data packets versus buffering data packets, based on the detection of data packet collisions, are segregated. Further, the segregation of these functionalities reduces the latency observed in the communication of the data packets from these network devices to other devices to which these network devices may be connected through a network.

19 Claims, 25 Drawing Sheets

(51) Int. Cl.
 *H04L 47/50* (2022.01)
 *H04W 28/02* (2009.01)

(56) References Cited

U.S. PATENT DOCUMENTS

| | | |
|---|---|---|
| 8,477,616 B1 | 7/2013 | Rogers et al. |
| 2003/0081624 A1 | 5/2003 | Aggarwal et al. |
| 2009/0268612 A1 | 10/2009 | Felderman et al. |
| 2010/0014428 A1 | 1/2010 | Naven et al. |
| 2013/0182716 A1 | 7/2013 | Gemelli et al. |

\* cited by examiner

METHOD AND NETWORK DEVICE FOR FORWARDING DATA PACKETS

BACKGROUND

Some network devices include data packet forwarding architecture implemented through a single component, which is often tasked with both forwarding data packets and buffering data packets when collisions transpire. However, this single-component implemented architecture does not scale easily with the cardinality of ingress network interfaces, and thus, introduces latency.

SUMMARY

In general, in one aspect, embodiments of the invention relate to a method for forwarding data packets. The method includes receiving, by a collision detector and forwarder (CDF), a first data packet arriving through a first ingress network interface (INI) and a second data packet arriving through a second INI, receiving, by a data packet buffer (DPB), a first data packet copy arriving through the first INI and a second data packet copy arriving through the second INI, selecting, by the CDF, the first data packet based on a first priority policy, forwarding, based on the selecting, the first data packet through an egress network interface (ENI) while discarding the second data packet, and buffering, by the DPB, the second data packet copy while discarding the first data packet copy.

In general, in one aspect, embodiments of the invention relate to a network device. The network device includes a plurality of network interfaces comprising a set of ingress network interfaces (INIs) and an egress network interface (ENI), and a collision detector and forwarder (CDF) operatively connected to the plurality of network interfaces, and programmed to receive a first data packet arriving through a first TNT of the set of INIs and a second data packet arriving through a second INI of the set of INIs, select the first data packet based on a first priority policy, and forward, based on the selecting, the first data packet through the ENI while discarding the second data packet.

Other aspects of the invention will be apparent from the following description and the appended claims.

DETAILED DESCRIPTION

Figure 1A:
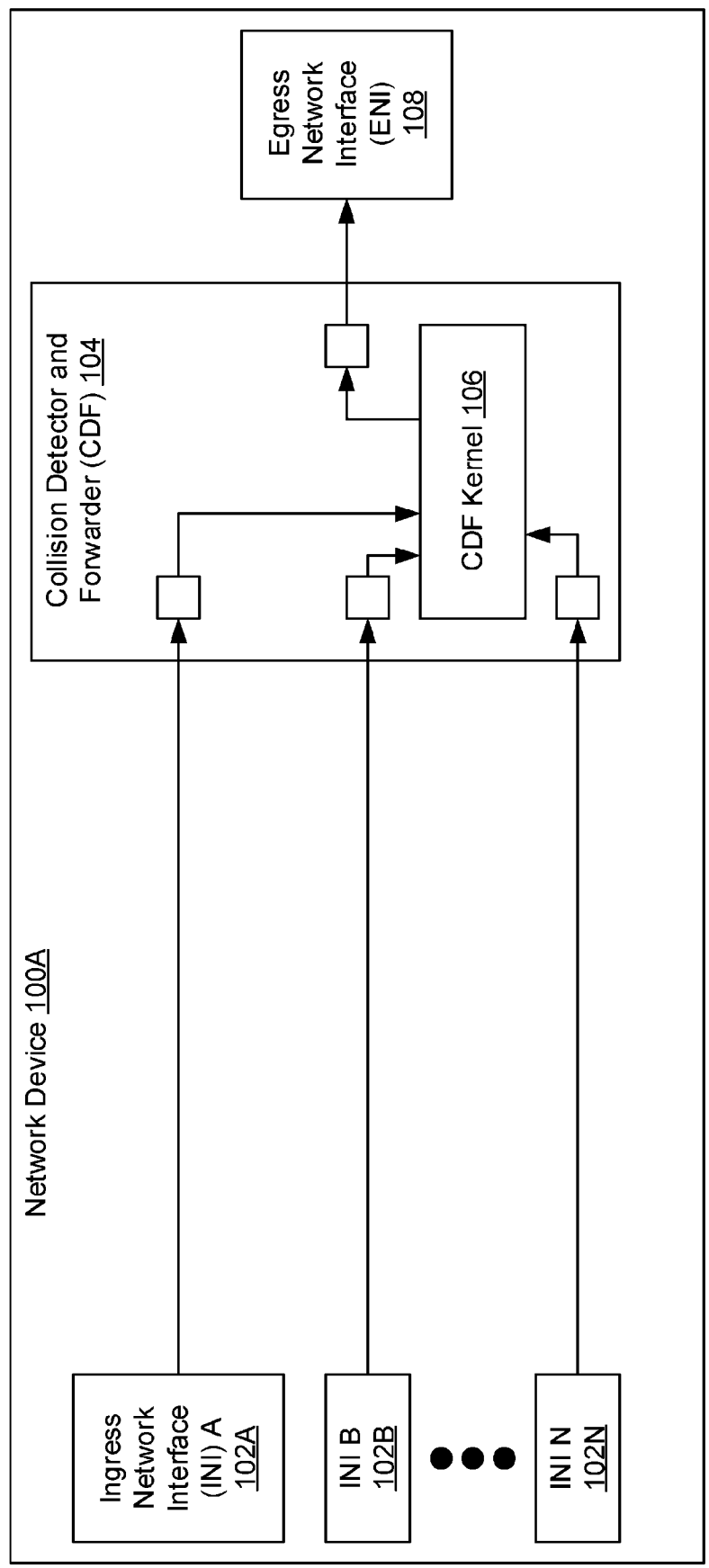
FIG. 1A shows a network device in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-9J, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connection the operatively connected components) connection.

In general, embodiments of the invention relate to a method and network device for forwarding data packets. Specifically, one or more embodiments of the invention separate the known data packet forwarding architecture in network devices, often implemented using a single component, into two components. In implementing the pair of components, functionalities directed to forwarding data packets versus buffering data packets, based on the detection of data packet collisions, are segregated. Further, the segregation of these functionalities reduces the latency observed in the communication of the data packets from these network devices to other devices to which these network devices may be connected through a network.

FIG. 1A shows a network device in accordance with one or more embodiments of the invention. The network device (100A) may be a physical device that includes, but is not limited to, all or any subset of the following: persistent storage, memory (e.g., random access memory (RAM)), one or more processors, one or more network chips, one or more circuit components (e.g., wire, resistors, capacitors, transistors, inductors, integrated circuit packages, printed circuit boards, diodes, comparators, multiplexers, etc.), one or more field programmable gate arrays (FPGAs), one or more application specific integrated circuits (ASICs), one or more complex programmable logic devices (CPLDs), and two or more physical network interfaces (which may also be referred to as ports). Further, the network device (100A) may be connected to other devices through wired (e.g., using the network interfaces) and/or wireless connections.

In one embodiment of the invention, the network device (100A) may include functionality to receive data packets (e.g., Ethernet media access control (MAC) frames, Internet Protocol (1P) packets, etc.) through one or more physical network interfaces, and determine whether to: (i) drop or discard the data packets; (ii) process the data packets in accordance with one or more embodiments of the invention; and/or (iii) forward or transmit the data packets out of one or more physical network interfaces towards another device or destination. Examples of the network device (100A) include, but are not limited to, a switch, a router, a multilayer switch, a fibre channel device, and an InfiniBand® device.

In one embodiment of the invention, the network device (100A), as mentioned above, may include a plethora of physical network interfaces. These physical network interfaces may include, but are not limited to, a set of ingress network interfaces (INIs) (102A-102N) and an egress network interface (ENI) (108). Each INI (102A-102N) may represent physical hardware (i.e., circuitry) that serves as a point of interconnection between the network device (100A) and a network (e.g., a local area network (LAN), a wide area network (WAN) such as the Internet, a mobile network, etc.) (not shown); and includes functionality to receive inbound data packets from other network-capable devices to which the network device (100A) may be operatively connected through the network. Meanwhile, the ENI (108) may represent physical hardware (i.e., circuitry) that serves as a point of interconnection between the network device (100A) and a network (not shown); and includes functionality to forward or transmit outbound data packets from the network device (100A) to other network-capable devices to which the network device (100A) may be operatively connected through the network.

In one embodiment of the invention, the network device (100A) may further include a collision detector and forwarder (CDF) (104). The CDF (104) may be any hardware (e.g., circuitry), software, firmware, or any combination thereof, that may be configured to detect data packet collisions; and forward or transmit data packets through the ENI (108) based, at least in part, on detected collisions. Furthermore, the CDF (104) may include a CDF kernel (106), which may represent the logic or intelligence of the CDF (104). The CDF kernel (106) may execute computer readable program code or instructions, which enable the CDF kernel (106) and/or the CDF (104) to perform various functionalities (described below) in accordance with one or more embodiments of the invention. By way of an example, the CDF (104) may be implemented using a multiplexer in conjunction with a microcontroller. One of ordinary skill will appreciate that additional or alternative hardware, software, and/or firmware components may be employed without departing from the scope of the invention.

In one embodiment of the invention, the CDF (104), as mentioned above, may be configured to detect data packet collisions. To that extent, the CDF (104) may include functionality to: receive one or more data packets through one or more INIs (102A-102N); assess whether the received data packet(s), at least in part, overlap one another temporally (i.e., in time); and determine whether collisions have occurred based on the aforementioned assessment. In one embodiment of the invention, when two or more data packets at least partially overlap one another in time, a data packet collision thus transpires. In contrast, collisions may not transpire when none of the received data packets temporally overlap one another; or alternatively, when just a single data packet is received.

In one embodiment of the invention, the CDF (104), as mentioned above, may be further be configured to forward or transmit data packets through the ENI (108). To that extent, the CDF (104) may include functionality to: assess the arrival of a single data packet to determine that a data packet collision has not transpired; and, based on this assessment, forward the single data packet out of the network device (100A) through the ENI (108). The CDF (104) may include additional functionality to: assess the arrival of two or more data packets to determine that a data packet collision has transpired; based on this assessment, select one data packet of the two or more data packets based on a priority policy (described below); and forward the selected data packet out of the network device (100A) through the ENI (108) while also discarding the remaining one or more data packets that had not been selected.

In one embodiment of the invention, a priority policy (with respect to the functionality of the CDF (104)) may be a forwarding prioritization rule for determining which new data packet should be forwarded over the other received new data packet(s). By way of an example, the priority policy may prioritize the forwarding of a new data packet based strictly on time of arrival. That is, forwarding priority may be granted to the new data packet that had arrived first. However, other priority policies, considering alternative criteria for selecting which new data packet to forward, may be employed without departing from the scope of the invention.

While FIG. 1A shows a configuration of components, other network device configurations may be used without departing from the scope of the invention. For example, refer to FIG. 1B described below.

Figure 1B:
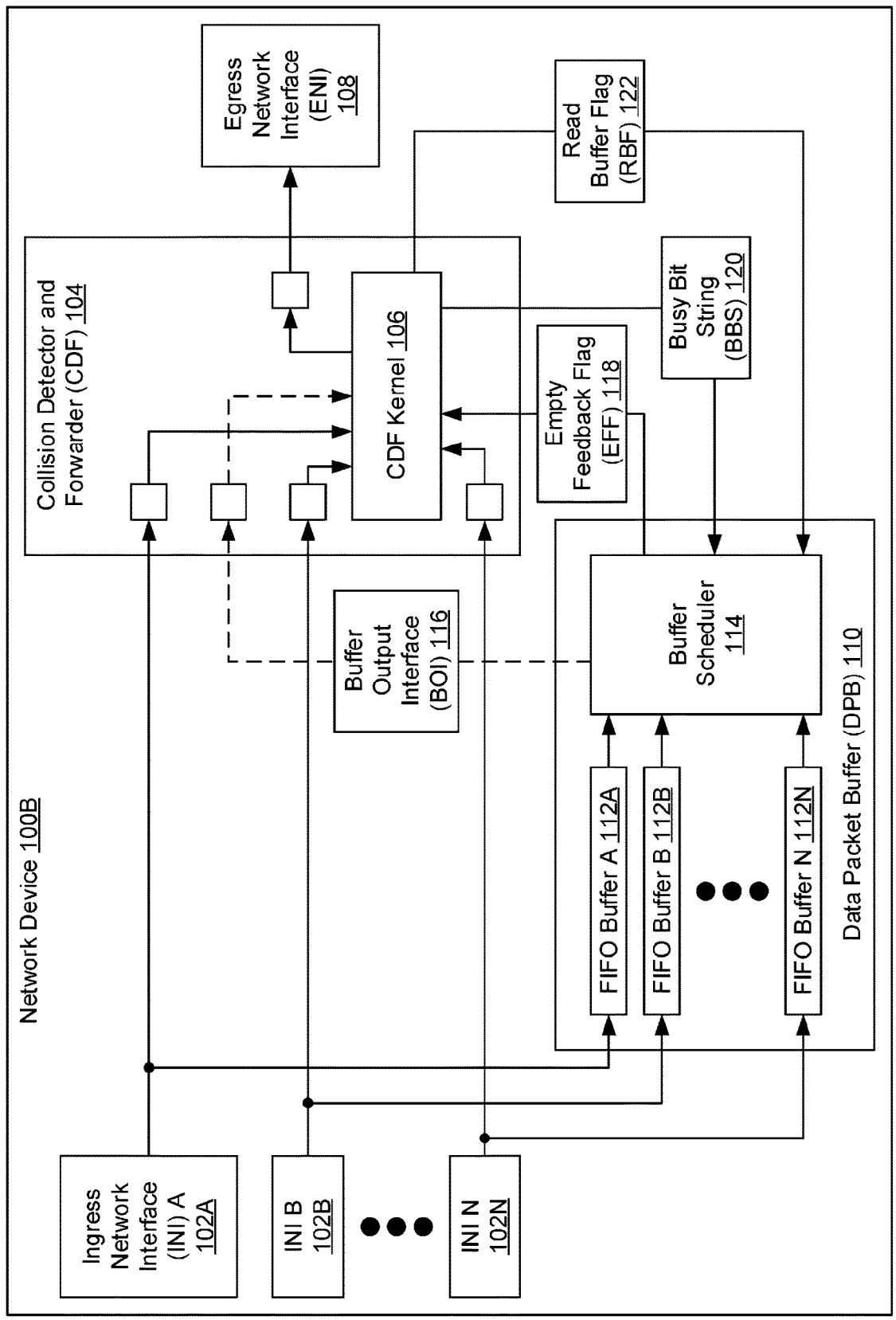
FIG. 1B shows a network device in accordance with one or more embodiments of the invention.

FIG. 1B shows a network device in accordance with one or more embodiments of the invention. The network device (100B), similar to the network device (100A) configuration illustrated in FIG. 1A, may include: (i) a plethora of physical network interfaces including, but not limited to, a set of ingress network interfaces (INIs) (102A-102N) and an egress network interface (ENI) (108); and (ii) a collision detector and forwarder (CDF) (104) configured to detect data packet collisions; and forward or transmit data packets through the ENI (108) based, at least in part, on detected collisions. Unlike the network device (100A) configuration illustrated in FIG. 1A, the network device (100B) may further include a data packet buffer (DPB) (110), which is described below.

In one embodiment of the invention, the DPB (110) may be any hardware (e.g., circuitry), software, firmware, or any combination thereof, that may be configured to buffer (i.e., store) or discard data packets, and provide buffered data packets (i.e., previously received data packets that may have been buffered) to the CDF (104), when prompted by the CDF (104). To that extent, the DPB (110) may include one or more first-in, first-out (FIFO) memory buffers (112A-112N) managed by a buffer scheduler (114). Each of these subcomponents is described below.

In one embodiment of the invention, each FIFO memory buffer (112A-112N) may represent a data storage structure that may be implemented as an array of contiguous memory (e.g., static RAM (SRAM), dynamic RAM (DRAM), etc.). The array of contiguous memory may constitute sufficient capacity to store one data packet or, alternatively, may constitute sufficient capacity to store multiple data packets. Further, each FIFO memory buffer (112A-112N) may store data packets on a first-in, first-out basis. That is, a first stored data packet in a FIFO memory buffer (112A-112N) will be the first retrieved data packet from the FIFO memory buffer (112A-112N), a second stored data packet in the FIFO memory buffer (112A-112N) will be the second retrieved data packet from the FIFO memory buffer (112A-112N), and so forth. Accordingly, for each FIFO memory buffer (112A-112N), data packets may be stored or written to a "head" of the FIFO memory buffer (112A-112N), whereas data packets may be retrieved or read from a "tail" of the FIFO memory buffer (112A-112N). Moreover, in one embodiment of the invention, there may be a separate FIFO memory buffer (112A-112N) operatively connected and dedicated to each INI (102A-102N) of the network device (100B). That is, the number of (i.e., cardinality of) FIFO memory buffers (112A-112N) at least equals or matches the number of (i.e., cardinality of) INIs (102A-102N).

In one embodiment of the invention, the buffer scheduler (114) may be any hardware (e.g., circuitry), software, firmware, or any combination thereof, that represents the logic or intelligence of the DPB (110). The buffer scheduler (114) may execute computer readable program code or instructions, which enable the buffer scheduler (114) and/or the DPB (110) to perform various functionalities (described below) in accordance with one or more embodiments of the invention. Specifically, the buffer scheduler (114) may be configured to manage the storage and retrieval of data packets into and from the one or more FIFO memory buffers (112A-112N), and to interact with the CDF (104) in accordance with embodiments of the invention.

To that extent, in one embodiment of the invention, the buffer scheduler (114) may include functionality to: receive one or more data packets (also referred herein as data packet copies) that may arrive through one or more INIs (102A-102N); receive instructions to either discard or buffer the received data packet copies based on the receipt of busy bit strings (BBSs) (120) (described below) issued by the CDF (104); update an empty feedback flag (EFF) (118) (described below) based on the collective current state of the one or more FIFO memory buffers (112A-112N); receive additional instructions to retrieve buffered (i.e., previously stored) data packet copies based on the state of a read buffer flag (RBF) (122) (described below) updated by the CDF (104); in response to detecting the enabling or toggling of the RBF (122), selecting a buffered data packet copy from a non-empty FIFO memory buffer (112A-112N) based on a priority policy (described below); and provide selected, buffered data packets to the CDF (104) through a buffer output interface (BOI) (116). The BOI (116) may represent a medium that operatively connects an output of the buffer scheduler (114) and/or the DPB (110) to an input of the CDF (104) and/or CDF kernel (106). One of ordinary skill will appreciate that the buffer scheduler (114) may perform other functionalities without departing from the scope of the invention.

In one embodiment of the invention, the CDF (104) of this network device (100B) configuration may additionally or alternatively include functionality to: assess the arrival of two or more data packets to determine that a data packet collision has transpired; based on this assessment, select one data packet of the two or more data packets based on a priority policy (described above); forward the selected data packet out of the network device (100B) through the ENI (108) while also discarding the remaining one or more data packets that had not been selected; issue BBSs (120) to the DPB (110), thereby instructing the DPB (110) to discard certain data packet copies (i.e., received by the DPB (110) and which may correspond to data packets selected for forwarding by the CDF (104)) while buffering the certain other data packet copies (i.e., received by the DPB (110) and which may correspond to data packets not selected for forwarding by the CDF (104)); obtain the status of the EFF (118) to ascertain the collective current state of the one or more FIFO memory buffers (112A-112N) of the DPB (110); track the forwarding progress of data packets selected for forwarding through the ENI (108); issue RBFs (122) to the DPB (110), thereby notifying the DPB (110) that it awaits the receipt of buffered data packets that may be retrieved from one or more non-empty FIFO memory buffers (112A-112N); and receive one or more buffered data packets from the DPB (110) through the BOI (116). One of ordinary skill will appreciate that the CDF (104) and/or CDF kernel (106) may perform other functionalities without departing from the scope of the invention.

In one embodiment of the invention, the EFF (118) may represent a variable or a value that acts as a signal for indicating a current state of the DPB (110). The states of the DPB (110) may include: (a) an empty state, indicating that each and every FIFO memory buffer (112A-112N) of the DPB is empty; and (b) a non-empty state, indicating that at least one FIFO memory buffer (112A-112N) of the DPB (110) is populated with a data packet. Subsequently, the EFF (118) may be implemented using binary (i.e., logical one or logical zero) or Boolean (i.e., true or false) values.

In one embodiment of the invention, a BBS (120) may represent a variable or value that serves as instructions for dictating the actions of the DPB (110) at least with regards to one or more data packet copies received by the DPB (110). A BBS (120) may be implemented through a sequence of bits (i.e., a series of binary of Boolean digits). Further, the cardinality (i.e., number of elements or bits) of a BBS (120) may equal or match the number of INIs (i.e., a cardinality of the set of INIs) (102A-102N) of the network device (100B). Accordingly, each bit of a BBS (120) may map to an INI (102A-102N) of the network device (100B). Generation of a BBS (120), by the CDF (104), is described in further detail below with respect to FIG. 5.

In one embodiment of the invention, the RBF (122) may represent a variable or a value that acts as a signal for indicating the ready-state of the CDF (104) to receive buffered data packets. The ready-states of the CDF (104) may include: (a) an open state, indicating that the CDF (104) awaits the receipt of a buffered data packet; and (b) a closed state, indicating that the CDF (104) is not concerned with receiving a buffered data packet. Subsequently, the RBF (122) may be implemented using binary (i.e., logical one or logical zero) or Boolean (i.e., true or false) values.

In one embodiment of the invention, a priority policy (with respect to the functionality of the DPB (110)) may be a retrieval prioritization rule for determining which buffered data packet should be provided to the CDF (104) over any other buffered data packet(s). By way of an example, the priority policy may prioritize the retrieval of a buffered data packet based strictly on time of storage or buffering. That is, retrieval priority may be granted to the buffered data packet that had been stored or written into memory first. However, other priority policies, considering alternative criteria for selecting which buffered data packet to retrieve, may be employed without departing from the scope of the invention.

While FIG. 1B shows a configuration of components, other network device configurations may be used without departing from the scope of the invention. For example, rather than cohabitating the same network device (100B), the CDF (104) may reside and operate within a first network device while the DPB (110) may reside and operate within a second network device, which may be operatively connected to the first network device.

Figure 2:
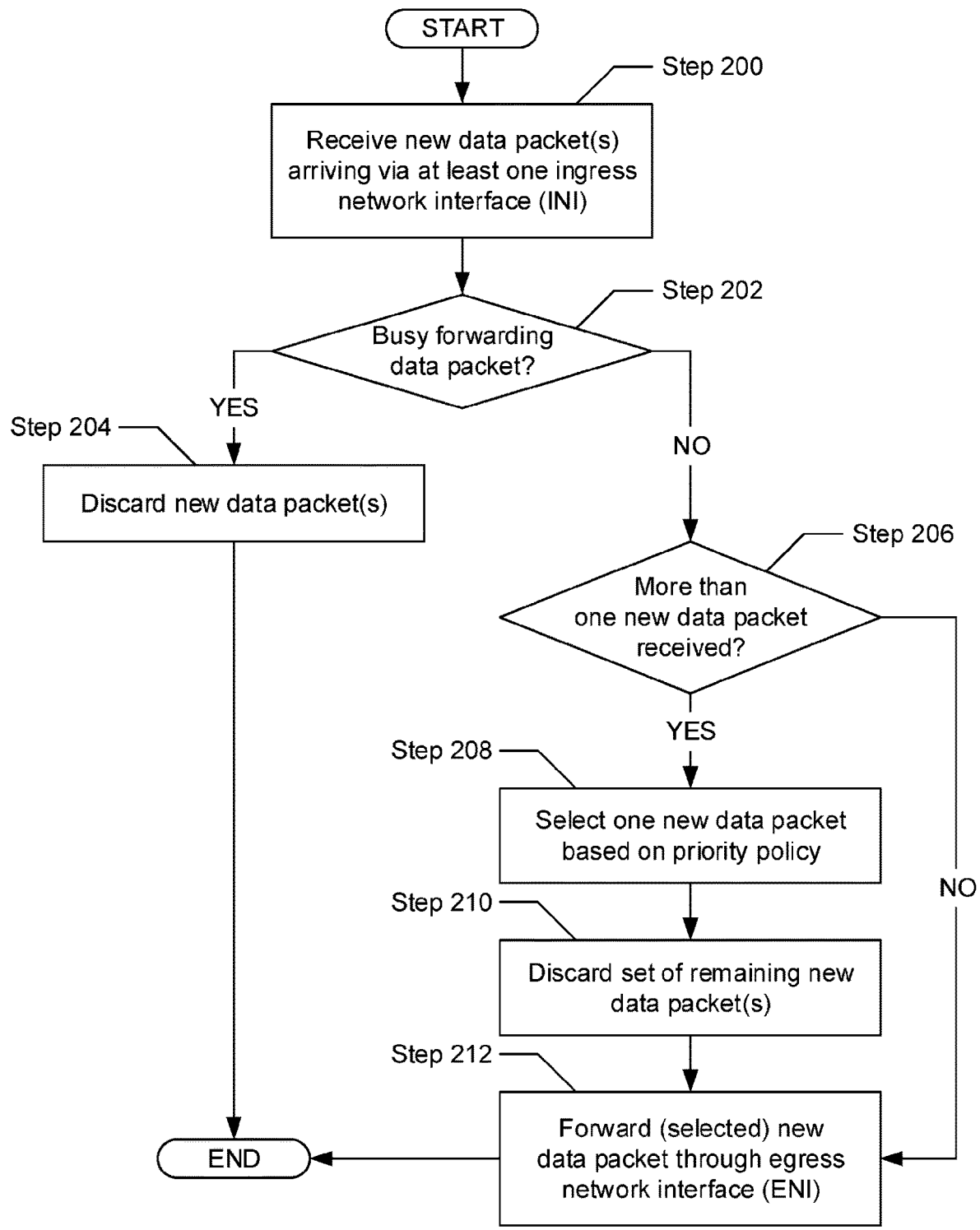
FIG. 2 shows a flowchart describing a method for forwarding data packets in accordance with one or more embodiments of the invention.

FIG. 2 shows a flowchart describing a method for forwarding data packets in accordance with one or more embodiments of the invention. The various steps outlined below may be performed by the collision detector and forwarder (CDF) of a network (see e.g., FIG. 1A). Further, while the various steps in the flowchart are presented and described sequentially, one of ordinary skill will appreciate that some or all steps may be executed in different orders, may be combined or omitted, and some or all steps may be executed in parallel. In one embodiment of the invention, the various steps shown in FIG. 2 may be performed in parallel with any other steps shown in FIGS. 3A-7 without departing from the scope of the invention.

Turning to FIG. 2, in Step 200, one or more new data packets is/are received. In one embodiment of the invention, the new data packet(s) may arrive through one or more ingress network interfaces (INIs), respectively. For example, if one new data packet is received, the new data packet may arrive through any one of multiple INIs of the network device. By way of another example, if more than one new data packet is received, each new data packet may arrive through a separate INI of the network device—e.g., a first new data packet may arrive through a first INI, a second new data packet may arrive through a second INI, a third new data packet may arrive through a third INI, and so forth. Further, in embodiments of the invention where more than one new data packet is received, the various new data packets may overlap, at least in part, with one another temporally (i.e., in time). When two or more new data packets arrive, at least partially overlapping one another in time, a temporal collision of the new data packets occurs and may be detected.

In Step 202, a determination is made as to whether the forwarding of another (i.e., previously received) data packet, through an egress network interface (ENI) of the network device, is still transpiring. The determination may entail, for example, monitoring the transmission medium or link operatively connecting the ENI to another device, and identifying whether the link is idle or busy. Accordingly, in one embodiment of the invention, if it is determined that another data packet is still in the process of being forwarded out of the network device through the ENI (i.e., the link is busy), then the process may proceed to Step 204. On the other hand, in another embodiment of the invention, if it is alternatively determined that another data packet has finished being forwarded out of the network device through the ENI (i.e., the link is idle), then the process may alternatively proceed to Step 206.

In Step 204, after determining (in Step 202) that another (i.e., previously received) data packet is still in the process of being forwarded out of the network device through the ENI (i.e., the link is busy), the new data packet(s) (received in Step 200) is/are discarded. In Step 206, however, after alternatively determining (in Step 202) that another (i.e., previously received) data packet has finished being forwarded out of the network device through the ENI (i.e., the link is idle), another determination is made as to whether more than one new data packet had been received (in Step 200). In one embodiment of the invention, if it is determined that only one new data packet had been received (thereby indicating that a data collision has not occurred), then the process may proceed to Step 212. On the other hand, in another embodiment of the invention, if it is alternatively determined that two or more new data packets had been received (thereby indicating the occurrence and detection of a data packet collision), then the process may alternatively proceed to Step 208.

In Step 208, after determining (in Step 206) that a data packet collision has transpired based on the arrival of two or more new data packets, a new data packet of the two or more new data packets (received in Step 200) is selected. In one embodiment of the invention, the selected data packet may be chosen based on a priority policy. The priority policy may be a forwarding prioritization rule for determining which new data packet should be forwarded over the other received new data packet(s). By way of an example, the priority policy may prioritize the forwarding of a new data packet based strictly on time of arrival. That is, forwarding priority may be granted to the new data packet that had arrived first. However, other priority policies, considering alternative criteria for selecting which new data packet to forward first, may be employed without departing from the scope of the invention.

In Step 210, a set of remaining new data packets is discarded. In one embodiment of the invention, the set of remaining new data packets may include the one or more new data packets that had not been selected (in Step 208). For example, had three new data packets been received (in Step 200) and the second new data packet had been selected (in Step 208), the set of remaining new data packets would include the first and third new data packets. Thereafter, in Step 212, after determining (in Step 206) that a data packet collision has not occurred due to the arrival of just one new data packet (in Step 200) or, alternatively, after discarding the set of remaining new data packet(s) (in Step 210), the single new data packet (received in Step 200) or the selected new data packet (chosen in Step 208) is subsequently forwarded out of the network device through the ENI.

Figure 3A:
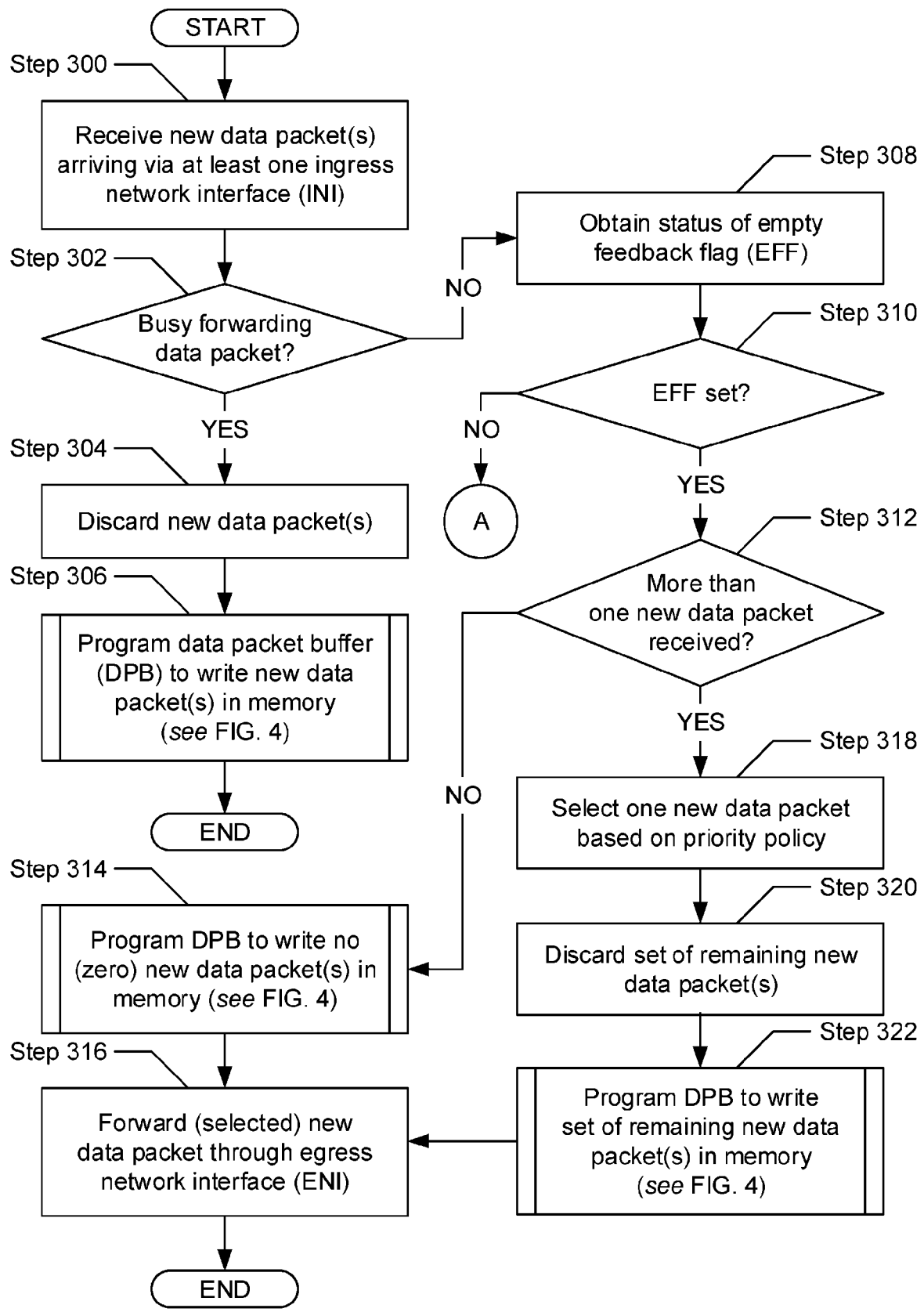
FIGS. 3A and 3B show flowcharts describing a method for forwarding data packets in accordance with one or more embodiments of the invention.
Figure 3B:
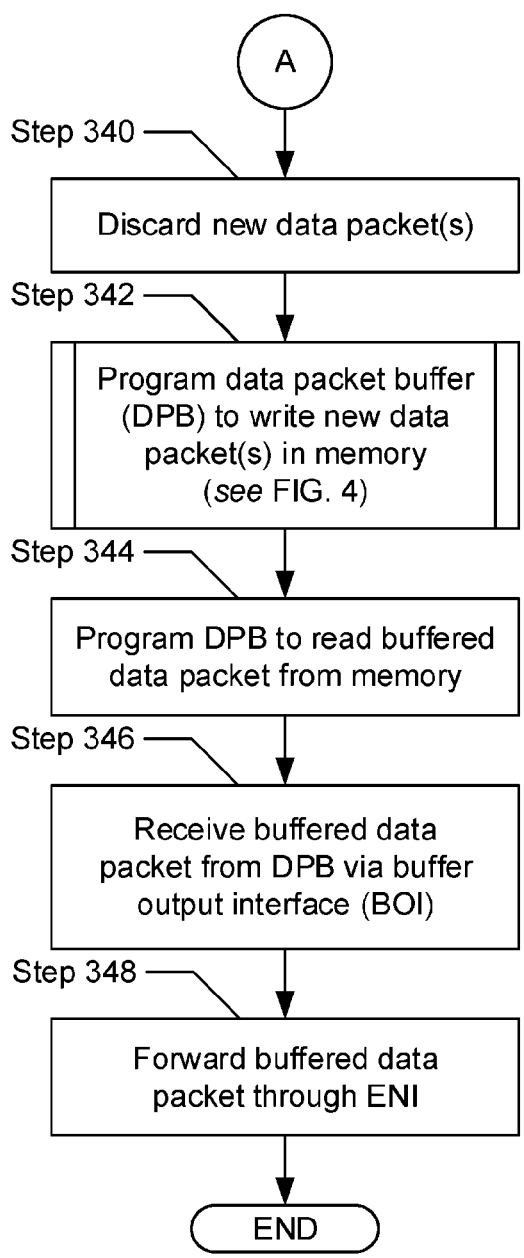

FIGS. 3A and 3B show flowcharts describing a method for forwarding data packets in accordance with one or more embodiments of the invention. The various steps outlined below may be performed by the collision detector and forwarder (CDF) of a network device (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel. In one embodiment of the invention, the various steps shown in FIGS. 3A and 3B may be performed in parallel with any other steps shown in FIGS. 2 and 4-7 without departing from the scope of the invention.

Turning to FIG. 3A, in Step 300, one or more new data packets is/are received. In one embodiment of the invention, the new data packet(s) may arrive through one or more ingress network interfaces (INIs), respectively. For example, if one new data packet is received, the new data packet may arrive through any one of multiple INIs of the network device. By way of another example, if more than one new data packet is received, each new data packet may arrive through a separate INI of the network device—e.g., a first new data packet may arrive through a first INI, a second new data packet may arrive through a second INI, a third new data packet may arrive through a third INI, and so forth. Further, in embodiments of the invention where more than one new data packet is received, the various new data packets may overlap, at least in part, with one another temporally (i.e., in time). When two or more new data packets arrive, at least partially overlapping one another in time, a temporal collision of the new data packets occurs and may be detected.

In Step 302, a determination is made as to whether the forwarding of another (i.e., previously received) data packet, through an egress network interface (ENI) of the network device, is still transpiring. The determination may entail, for example, monitoring the transmission medium or link operatively connecting the ENI to another device, and identifying whether the link is idle or busy. Accordingly, in one embodiment of the invention, if it is determined that another data packet is still in the process of being forwarded out of the network device through the ENI (i.e., the link is busy), then the process may proceed to Step 304. On the other hand, in another embodiment of the invention, if it is alternatively determined that another data packet has finished being forwarded out of the network device through the ENI (i.e., the link is idle), then the process may alternatively proceed to Step 308.

In Step 304, after determining (in Step 302) that another (i.e., previously received) data packet is still in the process of being forwarded out of the network device through the ENI (i.e., the link is busy), the new data packet(s) (received in Step 300) is/are discarded. Thereafter, in Step 306, the data packet buffer (DPB) (see e.g., FIG. 1B) of the network device is programmed. Specifically, in one embodiment of the invention, the DPB may be instructed to buffer the copy of the new data packet(s) that the DPB has received also through the one or more INIs of the network device. Programming of the DPB is described in further detail below with respect to FIG. 5.

In Step 308, after alternatively determining (in Step 302) that another (i.e., previously received) data packet has finished being forwarded out of the network device through the ENI (i.e., the link is idle), the status of an empty feedback flag (EFF) is obtained. In one embodiment of the invention, the EFF may represent a variable or a value that acts as a signal for indicating a current state of the DPB. The states of the DPB may include: (a) an empty state, indicating that each and every first-in, first-out (FIFO) memory buffer of the DPB is empty; and (b) a non-empty state, indicating that at least one FIFO memory buffer of the DPB is populated with a data packet. Subsequently, the EFF may be implemented using binary (i.e., logical one or logical zero) or Boolean (i.e., true or false) values.

In Step 310, a determination is made as to whether the EFF (the status of which was obtained in Step 308) is set or enabled. In one embodiment of the invention, if it is determined that the EFF is set/enabled, thereby indicating that the current state of the DPB is the above-mentioned empty state, then the process may proceed to Step 312. On the other hand, in another embodiment of the invention, if it is alternatively determined that the EFF is clear/disabled, thereby indicating that the current state of the DPB is the above-mentioned non-empty state, then the process may alternatively proceed to Step 340 (see e.g., FIG. 3B).

In Step 312, after determining (in Step 310) that the EFF is set or enabled, thus indicating that the current state of the DPB is the empty state, another determination is made as to whether more than one new data packet had been received (in Step 300). In one embodiment of the invention, if it is determined that only one new data packet had been received, then the process may proceed to Step 314. On the other hand, in another embodiment of the invention, if it is alternatively determined that two or more new data packets had been received, then the process may alternatively proceed to Step 318.

In Step 314, after determining (in Step 312) that only one new data packet had been received (in Step 300), the DPB of the network device is programmed. Specifically, in one embodiment of the invention, the DPB may be instructed to not buffer (i.e., discard) the copy of the new data packet that the DPB has received. Programming of the DPB is described in further detail below with respect to FIG. 5. Thereafter, in Step 316, the new data packet (received by the CDF in Step 300) is forwarded out of the network device through the ENI.

In Step 318, after determining (in Step 312) that two or more new data packets had been received (in Step 300), a new data packet of the two or more new data packets is selected. In one embodiment of the invention, the selected data packet may be chosen based on a priority policy. The priority policy may be a forwarding prioritization rule for determining which new data packet should be forwarded first upon the occurrence and detection of a temporal collision amongst the two or more new data packets. By way of an example, the priority policy may prioritize the forwarding of a new data packet (of the two or more new data packets) that had arrived first, at least temporally (i.e., a time of arrival). Other priority policies, considering alternative criteria for selecting which new data packet to forward first, may be employed without departing from the scope of the invention.

In Step 320, a set of remaining new data packets is discarded. In one embodiment of the invention, the set of remaining new data packets may include the one or more new data packets that had not been selected (in Step 318). For example, had three new data packets been received (in Step 300) and the second new data packet had been selected (in Step 318), the set of remaining new data packets would include the first and third new data packets.

In Step 322, the DPB of the network device is programmed. Specifically, in one embodiment of the invention, the DPB may be instructed to: (a) buffer each copy of the set of remaining new data packets that the DPB has received; and (b) not buffer (i.e., discard) the copy of the new data packet (selected in Step 318) that the DPB had received. Following the above example, with the second new data packet being selected from three new data packets, the DPB may be instructed to buffer the copy of the first new data packet and the copy of the third new data packet, while discarding the copy of the second new data packet, that the DPB has received. Programming of the DPB is described in further detail below with respect to FIG. 5. Thereafter, the process proceeds to Step 316, where the new data packet (selected in Step 318) is subsequently forwarded out of the network device through the ENI.

Turning to FIG. 3B, in Step 340, after determining (in Step 310) that the EFF is clear or disabled, thus indicating that the current state of DPB is the non-empty state, the new data packet(s) (received in Step 300) is/are discarded. Thereafter, in Step 342, the DPB of the network device is programmed.

Specifically, in one embodiment of the invention, the DPB may be instructed to buffer the copy of the new data packet(s) that the DPB has received through the one or more INIs of the network device. Programming of the DPB is described in further detail below with respect to FIG. 5.

In Step 344, the DPB of the network device is subsequently programmed to read and provide a buffered data packet. In one embodiment of the invention, a buffered data packet may be any previously received copy of a data packet (received by the DPB), which by instruction from the CDF, had been written or stored into a FIFO memory buffer of the DPB. Further, programming of the DPB to read/provide the buffered data packet may entail updating or modifying a read buffer flag (RBF') (see e.g., FIG. 1B) monitored by the DPB. The RBF may represent a variable or a value that acts as a signal for indicating the ready-state of the CDF to receive buffered data packets. The ready-states of the CDF may include: (a) an open state, indicating that the CDF awaits the receipt of a buffered data packet; and (b) a closed state, indicating that the CDF is not concerned with receiving a buffered data packet. Subsequently, the RBF may be implemented using binary (i.e., logical one or logical zero) or Boolean (i.e., true or false) values.

In Step 346, after instructing the DPB to read/provide a buffered data packet (in Step 344), the buffered data packet is received from the DPB. In one embodiment of the invention, the buffered data packet may be received through a buffer output interface (BOI) (see e.g., FIG. 1B). The BOI may represent a medium that operatively connects an output of the DPB to an input of the CDF. Thereafter, in Step 348, the buffered data packet (received in Step 346), is subsequently forwarded out of the network device through the ENI.

Figure 4:
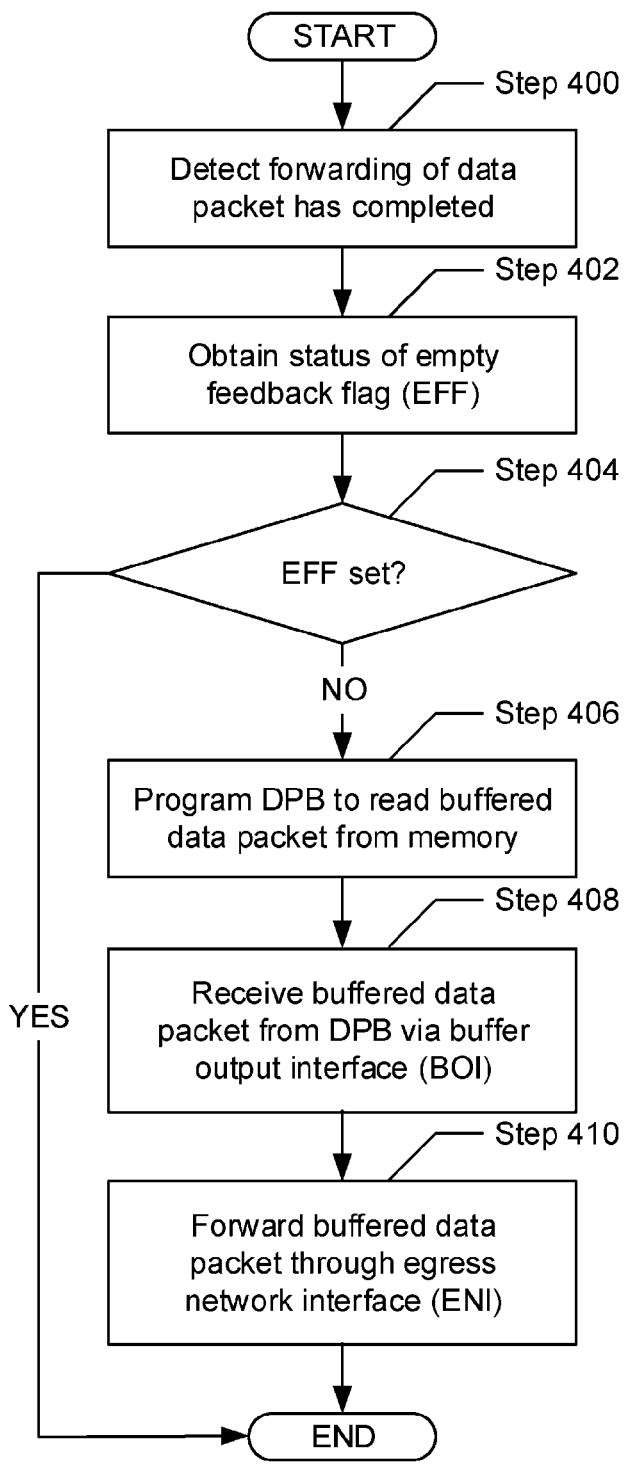
FIG. 4 shows a flowchart describing a method for forwarding data packets in accordance with one or more embodiments of the invention.

FIG. 4 shows a flowchart describing a method for forwarding data packets in accordance with one or more embodiments of the invention. The various steps outlined below may be performed by the collision detector and forwarder (CDF) of a network device (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel. In one embodiment of the invention, the various steps shown in FIG. 4 may be performed in parallel with any other steps shown in FIGS. 2-3B and 5-7 without departing from the scope of the invention.

Turning to FIG. 4, in Step 400, completion of the forwarding of a data packet (out of the network device through an egress network interface (ENI)) is detected. In one embodiment of the invention, the detection may entail, for example, monitoring the transmission medium or link operatively connecting the ENI to another device, and identifying that the link is currently in an idle state.

In Step 402, the status of an empty feedback flag (EFF) is obtained. In one embodiment of the invention, the EFF may represent a variable or a value that acts as a signal for indicating a current state of the data packet buffer (DPB) (see e.g., FIG. 1B) of the network device. The states of the DPB may include: (a) an empty state, indicating that each and every first-in, first-out (FIFO) memory buffer of the DPB is empty; and (b) a non-empty state, indicating that at least one FIFO memory buffer of the DPB is populated with a data packet. Subsequently, the EFF may be implemented using binary (i.e., logical one or logical zero) or Boolean (i.e., true or false) values.

In Step 404, a determination is made as to whether the EFF (the status of which was obtained in Step 402) is set or enabled. In one embodiment of the invention, if it is determined that the EFF is set/enabled, thereby indicating that the current state of the DPB is the above-mentioned empty state, then the process may end. On the other hand, in another embodiment of the invention, if it is alternatively determined that the EFF is clear/disabled, thereby indicating that the current state of the DPB is the above-mentioned non-empty state, then the process may alternatively proceed to Step 406.

In Step 406, after determining (in Step 404) that the EFF is clear or disabled, thus indicating that the current state of the DPB is the non-empty state, the DPB is programmed to read and provide a buffered data packet. In one embodiment of the invention, a buffered data packet may be any previously received copy of a data packet (received by the DPB), which by instruction from the CDF, had been written or stored into a FIFO memory buffer of the DPB. Further, programming of the DPB to read/provide the buffered data packet may entail updating or modifying a read buffer flag (RBF) (see e.g., FIG. 1B) monitored by the DPB. The RBF may represent a variable or a value that acts as a signal for indicating the ready-state of the CDF to receive buffered data packets. The ready-states of the CDF may include: (a) an open state, indicating that the CDF awaits the receipt of a buffered data packet; and (b) a closed state, indicating that the CDF is not concerned with receiving a buffered data packet. Subsequently, the RBF may be implemented using binary (i.e., logical one or logical zero) or Boolean (i.e., true or false) values.

In Step 408, after instructing the DPB to read/provide a buffered data packet (in Step 406), the buffered data packet is received from the DPB. In one embodiment of the invention, the buffered data packet may be received through a buffer output interface (BOI) (see e.g., FIG. 1B). The BOI may represent a medium that operatively connects an output of the DPB to an input of the CDF. Thereafter, in Step 410, the buffered data packet (received in Step 408), is subsequently forwarded out of the network device through the ENI.

Figure 5:
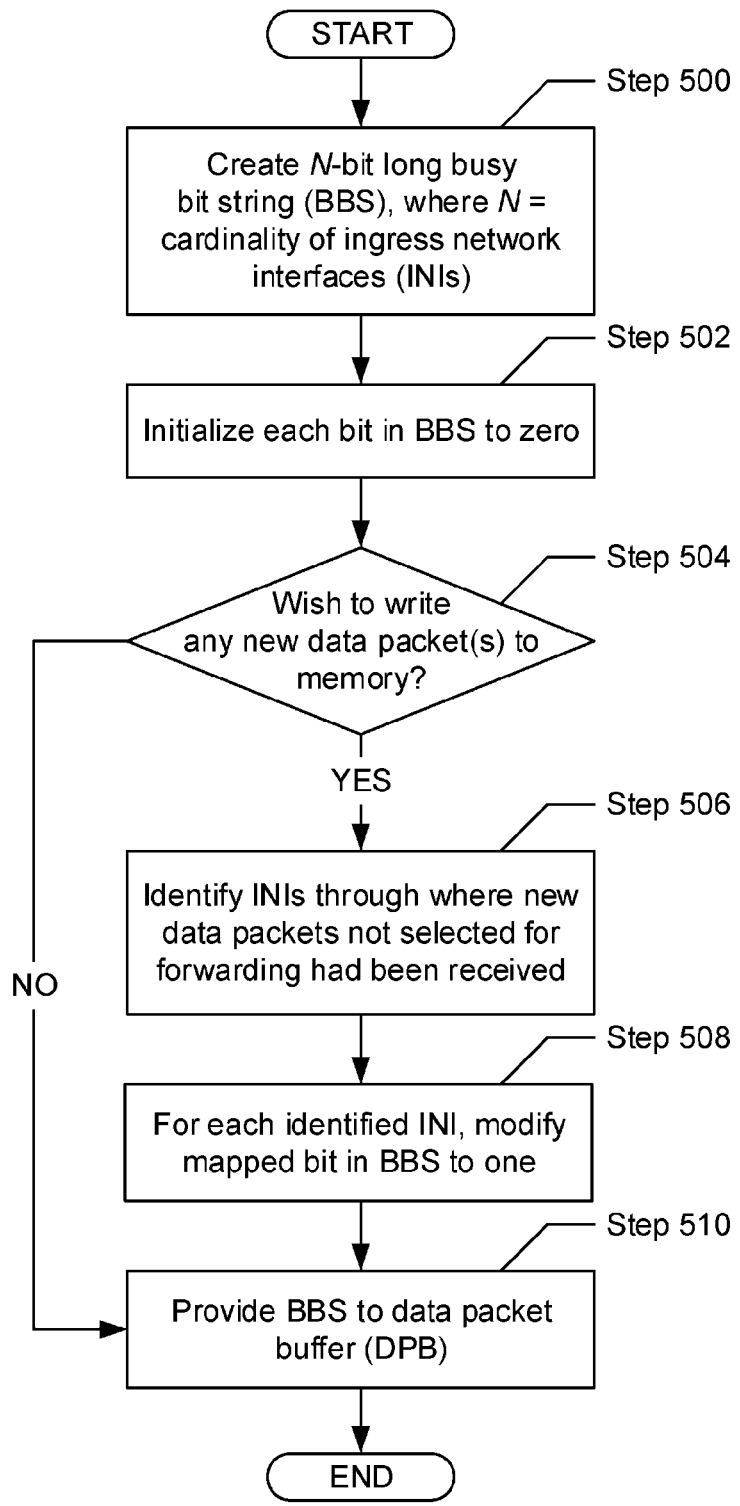
FIG. 5 shows a flowchart describing a method for programming a data packet buffer to write data packets in memory in accordance with one or more embodiments of the invention.

FIG. 5 shows a flowchart describing a method for programming a data packet buffer to write data packets in memory in accordance with one or more embodiments of the invention. The various steps outlined below may be performed by the collision detector and forwarder (CDF) of a network device (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel. In one embodiment of the invention, the various steps shown in FIG. 5 may be performed in parallel with any other steps shown in FIGS. 2-4, 6, and 7 without departing from the scope of the invention.

Turning to FIG. 5, in Step 500, a data object representative of a busy bit string (BBS) is created. In one embodiment of the invention, the BBS may represent a variable or value that serves as instructions for dictating the actions of the data packet buffer (DPB) of the network device (see e.g., FIG. 1B), at least with regards to one or more new data packet copies received by the DPB. The BBS may be implemented through a sequence of bits (i.e., a series of binary of Boolean digits). Further, the cardinality (i.e., number of elements or bits) of the BBS may equal or match the number of ingress network interfaces (INIs) (i.e., a cardinality of the set of INIs) of the network device. Accordingly, each bit of the BBS may map to an INI of the network device.

In Step 502, each bit forming the BBS is initialized to an initial value. The initial value may be the binary or Boolean value selected to represent a discard instruction, which may direct the DPB to discard a given received copy of a new data packet. In one embodiment of the invention, the initial value (or discard instruction) may be implemented using the binary logical zero or Boolean false value. In another embodiment of the invention, the initial value (or discard instruction) may alternatively be implemented using the binary logical one or Boolean true value.

In Step 504, a determination is made as to whether any received new data packet copies should be buffered in the memory of the DPB. As described above through the method outlined in FIGS. 3A and 3B, the DPB may be programmed to buffer zero, one, or more than one received new data packet copy depending on various scenarios which consider the current state of various factors such as the status of an empty feedback flag (EFF) (described above), the status of a transmission medium or link operatively connecting an egress network interface (ENI) of the network device and another device, the detection of a temporal collision between received new data packets, etc. Accordingly, in one embodiment of the invention, if it is determined that zero received new data packet copies (i.e., received by the DPB) are to be buffered, or rather that any new data packet copy received by the DPB should be discarded, then the process may proceed to Step 510. On the other hand, in another embodiment of the invention, if it is alternatively determined that at least one received new data packet copy (i.e., received by the DPB) is to be buffered, then the process may alternatively proceed to Step 506.

In Step 506, after determining (in Step 504) that at least one new data packet copy, received by the DPB, is to be buffered or written into memory, a subset of INN of the network device is identified. In one embodiment of the invention, the subset of INIs may include each INI through which a new data packet has been received and where the new data packet has not been selected for forwarding out of the network device through the ENI. For example, assume that new data packets arrive through three out of eight INIs—i.e., a first new data packet through a first INI, a second new data packet through a fourth MI, and a third new data packet through a sixth INI. The CDF, based on the current state of various factors, opts to forward the first new data packet while opting to buffer the second and third new data packets. Subsequently, the subset of INIs that may be identified may include the fourth and sixth INIs, which (at least in this non-limiting example) represent INIs through which new data packets, not selected for forwarding, had been received.

In Step 508, for each INI of the subset of INIs (identified in Step 506), a bit of the BBS (created in Step 500) mapped to the INI is modified to a non-initial value. The non-initial value may be the binary or Boolean value selected to represent a buffer instruction, which may direct the DPB to buffer a given received copy of a new data packet. In one embodiment of the invention, the non-initial value (or buffer instruction) may be implemented using the binary logical one or Boolean true value. In another embodiment of the invention, the non-initial value (or buffer instruction) may alternatively be implemented using the binary logical zero or Boolean false value. Thereafter, in Step 510, the BBS is provided to the DPB.

Figure 6:
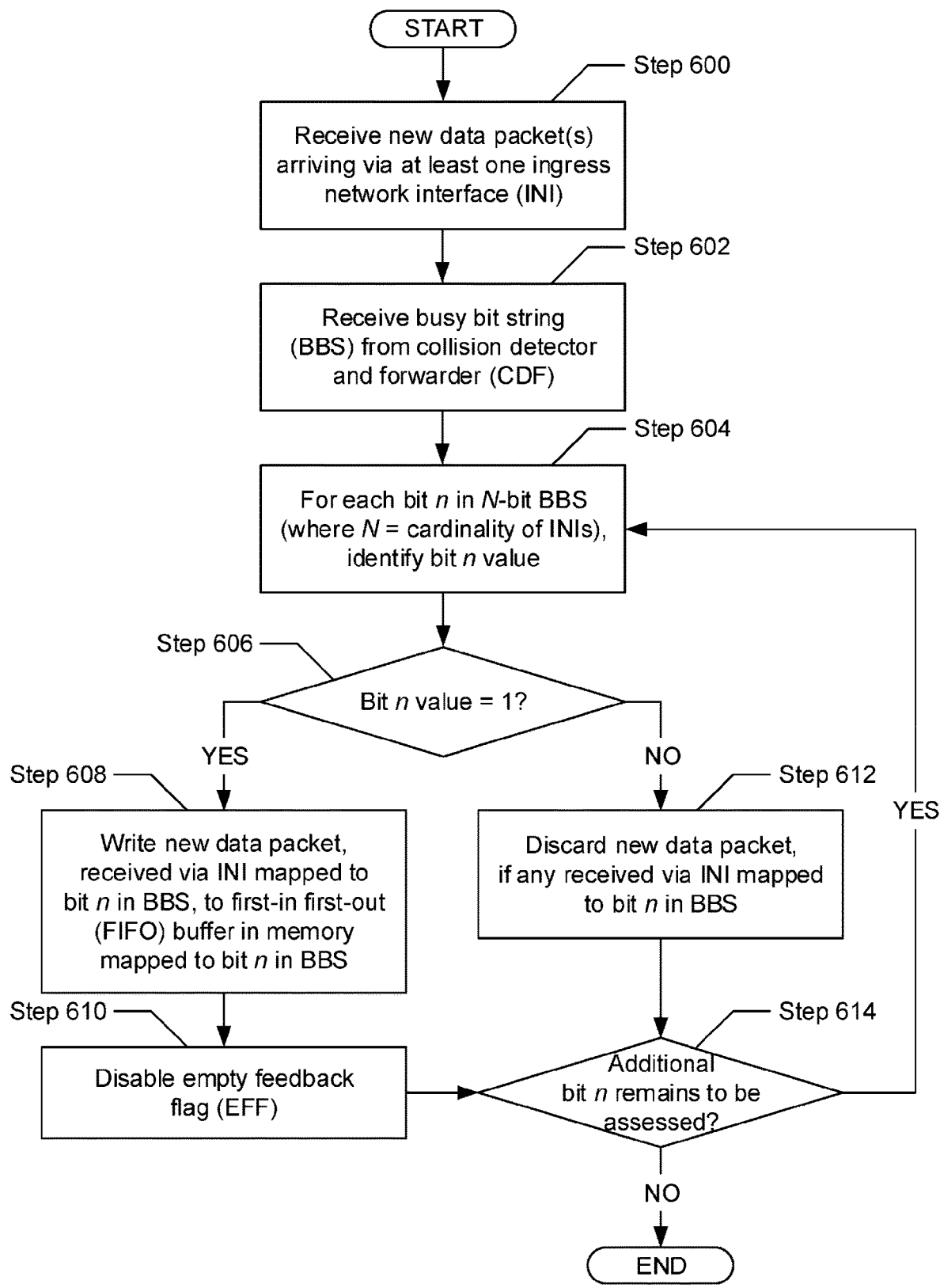
FIG. 6 shows a flowchart describing a method for buffering data packets in accordance with one or more embodiments of the invention.

FIG. 6 shows a flowchart describing a method for buffering data packets in accordance with one or more embodiments of the invention. The various steps outlined below may be performed by the data packet buffer (DPB) of a network device (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel. In one embodiment of the invention, the various steps shown in FIG. 6 may be performed in parallel with any other steps shown in FIGS. 2-5 and 7 without departing from the scope of the invention.

Turning to FIG. 6, in Step 600, one or more new data packets (also referred herein as one or more data packet copies) is/are received. In one embodiment of the invention, the new data packet(s) (copy or copies) may arrive through one or more ingress network interfaces (INIs), respectively. For example, if one new data packet (copy) is received, the new data packet (copy) may arrive through any one of multiple INIs of the network device. By way of another example, if more than one new data packet (copy) is received, each new data packet (copy) may arrive through a separate INI of the network device—e.g., a first new data packet (copy) may arrive through a first INI, a second new data packet (copy) may arrive through a second INI, a third new data packet (copy) may arrive through a third INI, and so forth. Further, in embodiments of the invention where more than one new data packet (copy) is received, the various new data packets (copies) may overlap, at least in part, with one another temporally (i.e., in time).

In Step 602, a busy bit string (BBS) is received from the collision detector and forwarder (CDF) of the network device (see e.g., FIG. 1B). In one embodiment of the invention, the BBS may represent a variable or value that serves as instructions for dictating the actions of the DPB, at least with regards to the new data packet(s) (copy or copies) (received in Step 600). The BBS may be implemented through a sequence of bits (i.e., a series of binary of Boolean digits). Further, the cardinality (i.e., number of elements or bits) of the BBS may equal or match the number of INIs (i.e., a cardinality of the set of INIs) of the network device. Accordingly, each bit of the BBS may map to an INI of the network device.

In Step 604, for each bit of the sequence of bits forming the BBS (received in Step 602), the binary or Boolean value representative of the bit is identified. In one embodiment of the invention, each bit may be the binary or Boolean value selected to represent a discard instruction (e.g., the binary logical zero or Boolean false value), which may direct the DPB to discard a given received copy of a new data packet; or, alternatively, each bit may be the binary or Boolean value selected to represent a buffer instruction (e.g., the binary logical one or Boolean true value), which may direct the DPB to alternatively buffer the given received copy of a new data packet.

In Step 606, for each bit value (identified in Step 604), a determination is made as to whether the bit value matches the binary or Boolean value selected to represent the buffer instruction (e.g., the binary logical one or Boolean true value). Accordingly, in one embodiment of the invention, if it is determined that the bit value indeed matches the binary or Boolean value selected to represent the buffer instruction, then the process may proceed to Step 608. On the other hand, in another embodiment of the invention, if it is alternatively determined that the bit value instead matches the binary or Boolean value selected to represent the discard instruction, then the process may alternatively proceed to Step 612.

In Step 608, after determining (in Step 606) that a given bit value (identified in Step 604) matches the binary or Boolean value selected to represent the buffer instruction, a copy of a new data packet (received in Step 600) is buffered. Specifically, in one embodiment of the invention, the buffered new data packet (copy) may refer to the new data packet (copy) that had been received through a particular INI of the network device, where the particular INI maps to the bit of the BBS associated with the given bit value. For example, assume that a second bit position in a received BBS expresses a bit value matching the binary or Boolean value selected to represent the buffer instruction, where the second bit position is mapped to a second INI of the network device. Then, based at least on this non-limiting example, the new data packet (copy) received through the second INI would be buffered.

Furthermore, in one embodiment of the invention, buffering the copy of the new data packet may entail writing or storing the new data packet (copy) in a first-in first-out (FIFO) memory buffer mapped and dedicated to the particular INI of the network device through which the new data packet (copy) had been received. That is, following the aforementioned example, assuming that a second FIFO memory buffer is mapped to the second INI of the network device, the new data packet (copy) received through the second INI would be written or stored in the second FIFO memory buffer.

In Step 610, following the buffering of any new data packet (copy) (in Step 608), an empty feedback flag (EFF) is cleared or disabled. In one embodiment of the invention, the EFF may represent a variable or a value that acts as a signal for indicating a current state of the DPB of the network device. The states of the DPB may include: (a) an empty state, indicating that each and every FIFO memory buffer of the DPB is empty; and (b) a non-empty state, indicating that at least one FIFO memory buffer of the DPB is populated with a data packet. In clearing or disabling the EFF, the EFF may be updated or modified to express, for example, the binary logical zero or Boolean false value. From here, the process may proceed to Step 614 (described below).

In Step 612, after determining (in Step 606) that a given bit value (identified in Step 604) matches the binary or Boolean value selected to represent the discard instruction, a copy of a new data packet (if any is received in Step 600) is discarded. Specifically, in one embodiment of the invention, the discarded new data packet (copy) may refer to the new data packet (copy) that had been received through a particular INI of the network device, where the particular INI maps to the bit of the BBS associated with the given bit value. For example, assume that a fourth bit position in a received BBS expresses a bit value matching the binary or Boolean value selected to represent the discard instruction, where the fourth bit position is mapped to a fourth INI of the network device. Then, based at least on this non-limiting example, the new data packet (copy) received through the fourth INI would be discarded.

In one embodiment of the invention, not every bit of the BBS, having a bit value matching the binary or Boolean value selected to represent the discard instruction, may be associated with a received new data packet (copy). That is, the BBS may disclose a subset of bits, which may each retain the discard instruction bit value despite the lack of a new data packet arriving through the INIs mapped to the bit(s) of the subset of bits. In such an embodiment, this subset of bits of the BBS may be ignored following a quick determination that none of the new data packets (copies) (received in Step 600) had arrived through any INI mapped to the subset of bits.

In Step 614, after disabling the EFF (in Step 610) or, alternatively, after fulfilling or ignoring a discard instruction associated with a bit of the BBS (in Step 612), a determination is made as to whether at least one additional bit of the BBS remains to be assessed (i.e., remains to be evaluated in view of Steps 606 through 612). In one embodiment of the invention, if it is determined that one or more bits of the BBS remain to be assessed, then the process may proceed to Step 604, where the bit value for a next bit in the sequence of bits forming the BBS may be identified. On the other hand, in another embodiment of the invention, if it is alternatively determined that no additional bits of the BBS remain to be assessed, then the process ends.

Figure 7:
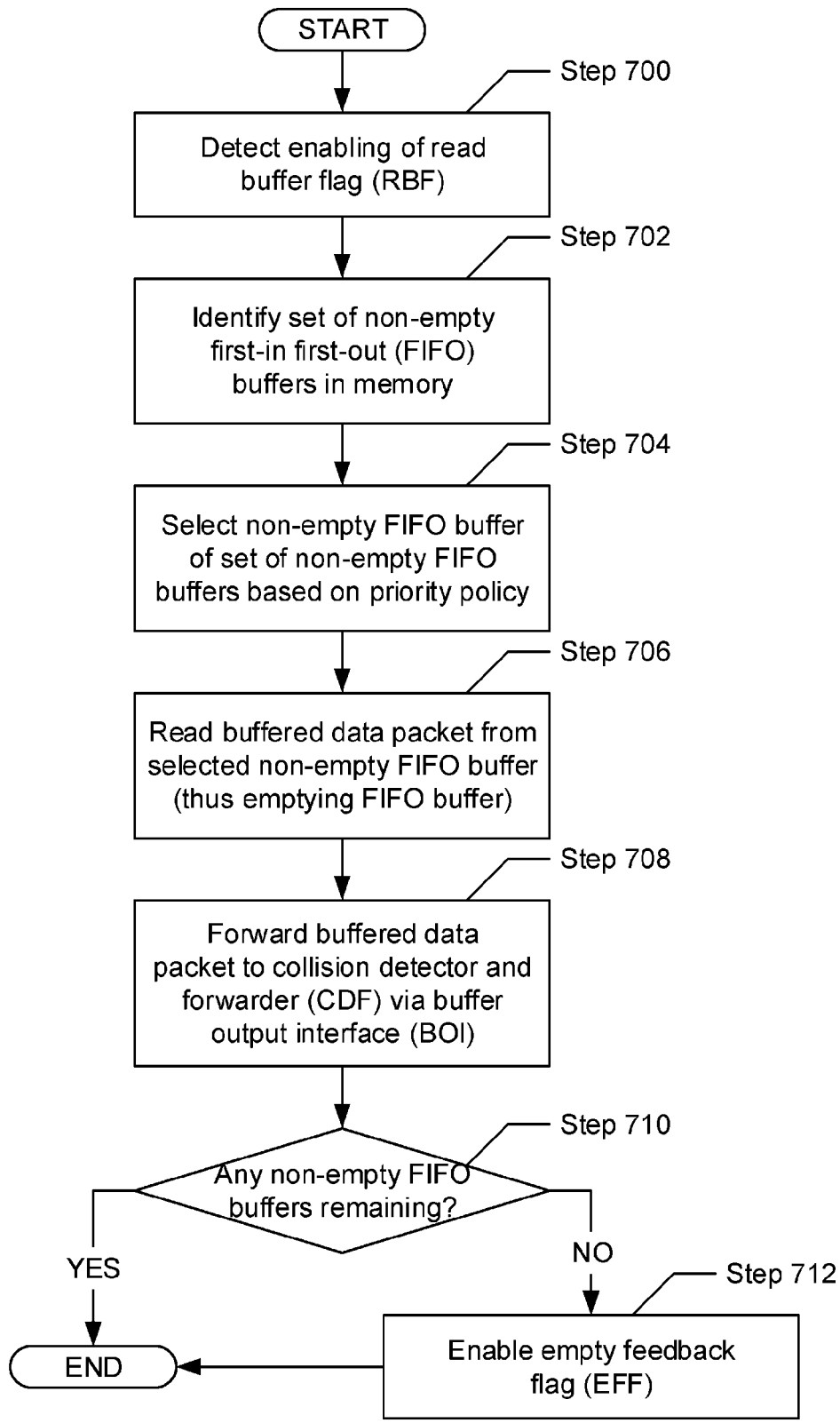
FIG. 7 shows a flowchart describing a method for retrieving buffered data packets in accordance with one or more embodiments of the invention.

FIG. 7 shows a flowchart describing a method for retrieving buffered data packets in accordance with one or more embodiments of the invention. The various steps outlined below may be performed by the data packet buffer (DPB) of a network device (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel. In one embodiment of the invention, the various steps shown in FIG. 7 may be performed in parallel with any other steps shown in FIGS. 2-6 without departing from the scope of the invention.

Turning to FIG. 7, in Step 700, a setting or enabling of a read buffer flag (RBF) is detected. In one embodiment of the invention, the RBF may represent a variable or a value that acts as a signal for indicating the ready-state of the collision detector and forwarder (CDF) of the network device (see e.g., FIG. 1B) to receive buffered data packets. The ready-states of the CDF may include: (a) an open state, indicating that the CDF awaits the receipt of a buffered data packet; and (b) a closed state, indicating that the CDF is not concerned with receiving a buffered data packet. In detecting the setting or enabling of the RBF, the RBF may be updated or modified to express, for example, the binary logical one or Boolean true value.

In Step 702, a set of non-empty first-in first out (FIFO) memory buffers of the DPB is identified. In one embodiment of the invention, a non-empty FIFO memory buffer may refer to a FIFO memory buffer populated with a data packet that had been written or stored therein by way of instructions received through a previously received busy bit string (BBS) (see e.g., FIG. 6).

In Step 704, a non-empty FIFO memory buffer of the set of non-empty FIFO memory buffers (identified in Step 702) is selected. In one embodiment of the invention, the selected non-empty FIFO memory buffer may be chosen based on a priority policy. The priority policy may be a forwarding prioritization rule for determining which buffered data packet (i.e., data packet buffered in a non-empty FIFO memory buffer) should be forwarded next. By way of an example, the priority policy may prioritize the forwarding of a buffered data packet (of a set of buffered data packets) that had arrived first, at least temporally (i.e., a time of arrival). Other priority policies, considering alternative criteria for selecting which buffered data packet to forward next, may be employed without departing from the scope of the invention.

In Step 706, a buffered data packet is read or retrieved from the non-empty FIFO memory buffer (selected in Step 704). In one embodiment of the invention, retrieval of the buffered data packet may subsequently empty the selected non-empty FIFO memory buffer, thereby transitioning the selected non-empty FIFO memory buffer into an empty FIFO memory buffer. Thereafter, in Step 708, the buffered data packet (retrieved in Step 706) is provided to the CDF through the buffer output interface (BOI). In one embodiment of the invention, the BOI may represent a medium that operatively connects an output of the DPB to an input of the CDF.

In Step 710, a determination is made as to whether there are any remaining non-empty FIFO memory buffers in the DPB. The determination may consider the recent transitioning of the non-empty FIFO memory buffer (selected in Step 704) to an empty state. In one embodiment of the invention, if it is determined that at least one FIFO memory buffer is not empty, indicating that the selected non-empty FIFO memory buffer had not been the last non-empty FIFO memory buffer, then the process ends (i.e., an empty feedback flag (EFF) remains unchanged). On the other hand, in another embodiment of the invention, if it is alternatively determined that all of the FIFO memory buffers are empty, indicating that the selected non-empty FIFO memory buffer had been the last non-empty FIFO memory buffer, then the process may proceed to Step 712.

In Step 712, after determining (in Step 710) that all FIFO memory buffers of the DPB are empty, the EFF is set or enabled. In one embodiment of the invention, the EFF may represent a variable or a value that acts as a signal for indicating a current state of the DPB of the network device. The states of the DPB may include: (a) an empty state, indicating that each and every FIFO memory buffer of the DPB is empty; and (b) a non-empty state, indicating that at least one FIFO memory buffer of the DPB is populated with a data packet. In setting or enabling the EFF, the EFF may be updated or modified to express, for example, the binary logical one or Boolean true value.

FIGS. 8A-8G show an example network device executing various example scenarios in accordance with one or more embodiments of the invention. The following example scenarios, presented in conjunction with components shown in FIGS. 8A-8G, are for explanatory purposes only and not intended to limit the scope of the invention.

Figure 8A:
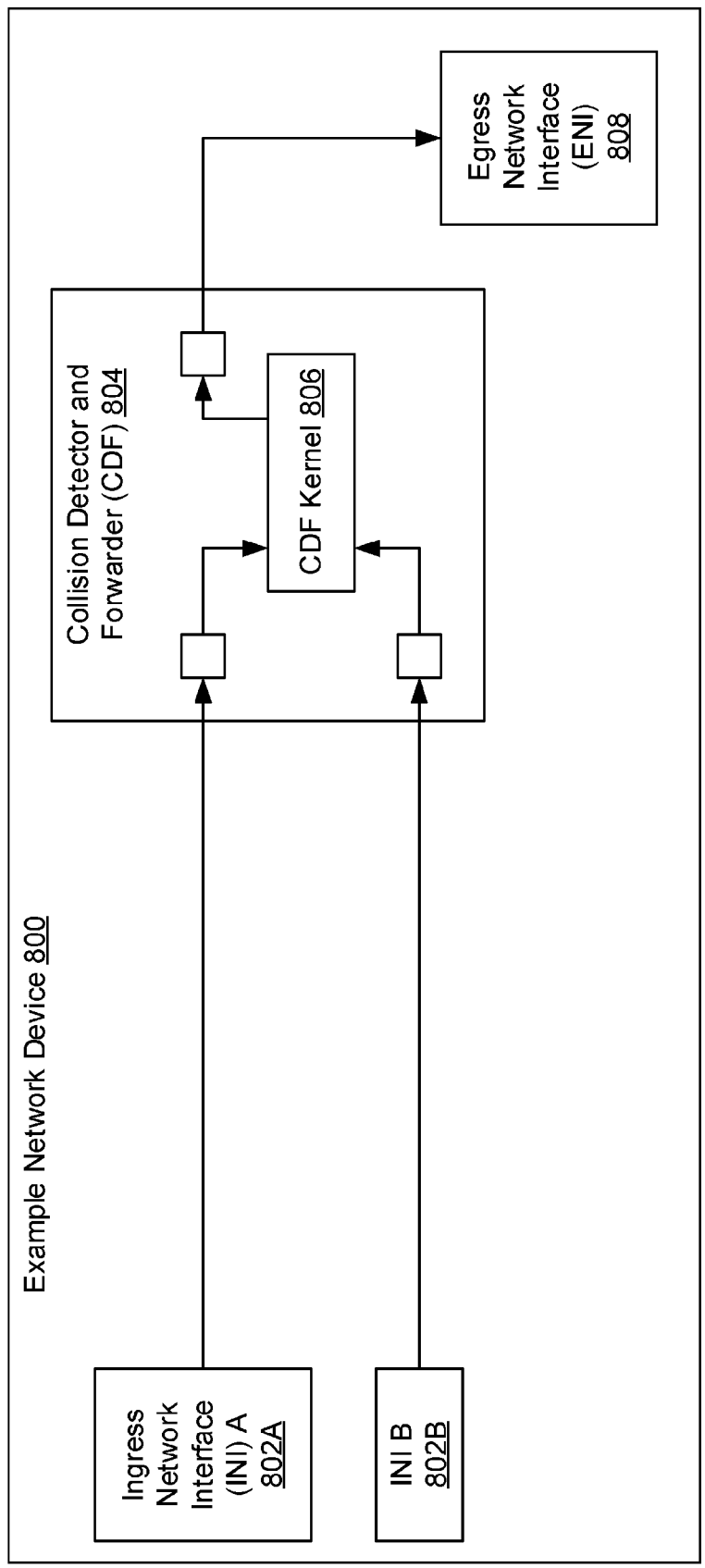
FIGS. 8A-8G show an example network device executing various example scenarios in accordance with one or more embodiments of the invention.

Turning to FIG. 8A, the example network device (800) resembles the network device configuration portrayed in FIG. 1A. Accordingly, the example network device (800) includes multiple physical network interfaces, including two ingress network interfaces (INIs) (802A, 802B) and an egress network interface (ENI) (808). Each of the INIs (802A, 802B) feeds into a collision detector and forwarder (CDF) (804), whose actions may be governed by a CDF kernel (806). Further, the CDF (804) and/or CDF kernel (806) is/are connected to the ENI (808), through which data packets may be forwarded.

Example Scenario A-1

Figure 8B:
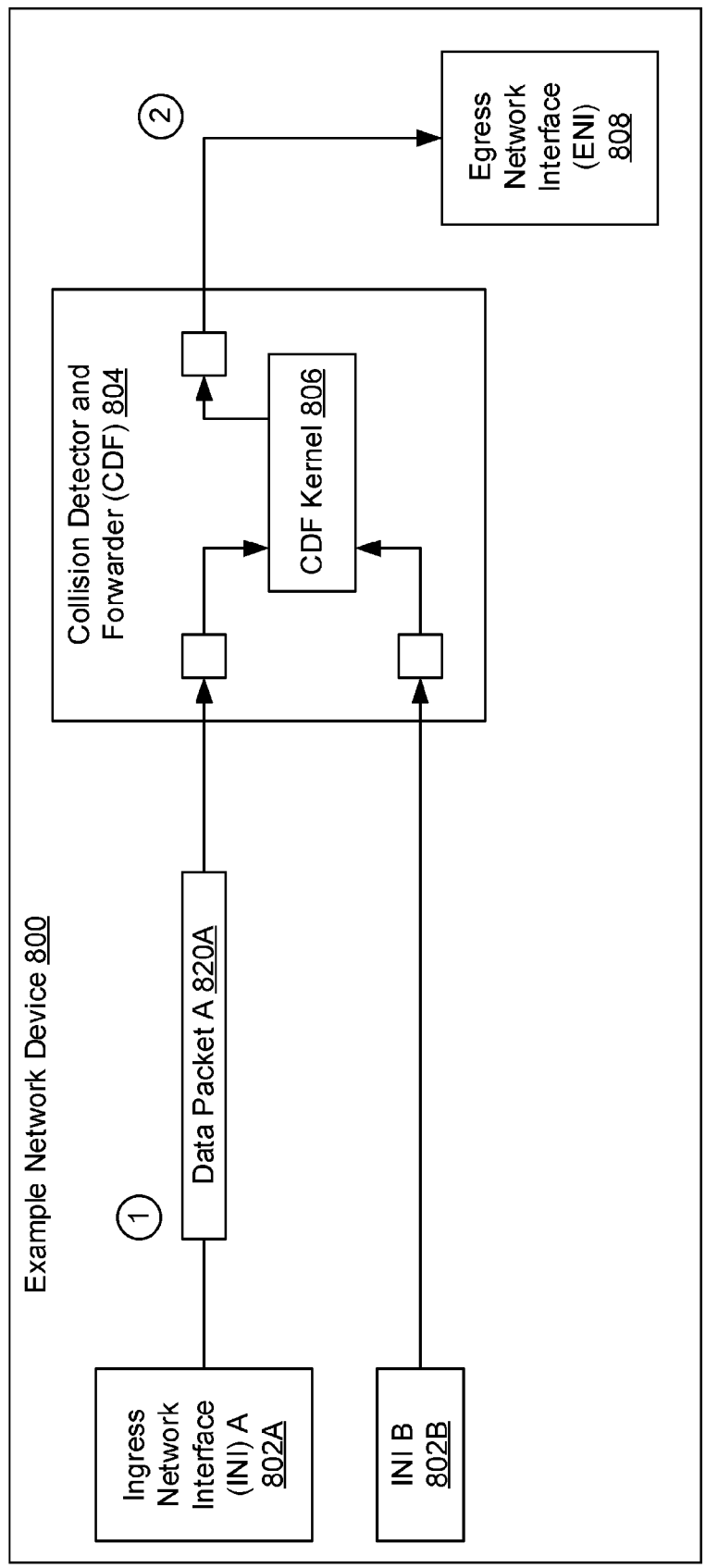
Figure 8C:
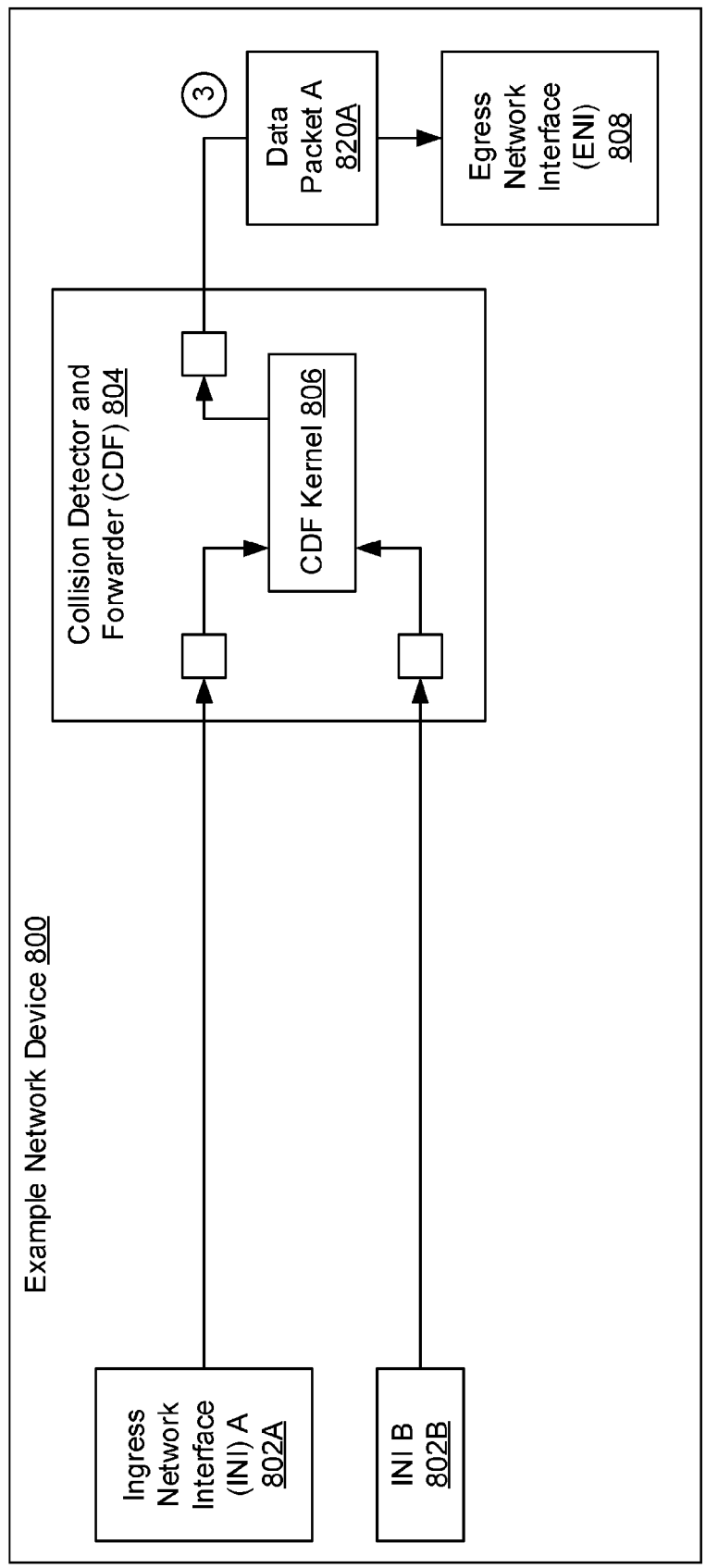

For this example scenario, consider FIGS. 8B and 8C in view of the enumerated annotations therein. Turning to FIG. 8B, (1) the CDF (804) receives a first new data packet (820A) arriving through the first INI (802A). In response to receiving the first new data packet (820A), (2) the CDF (804) queries whether it is busy forwarding another (i.e., previously received) data packet through the ENI (808)—thus determining it is not busy. Subsequently, turning to FIG. 8C, based on the aforementioned determination, (3) the CDF (804) forwards the first new data packet (820A) through the ENI (808).

Example Scenario A-2

Figure 8D:
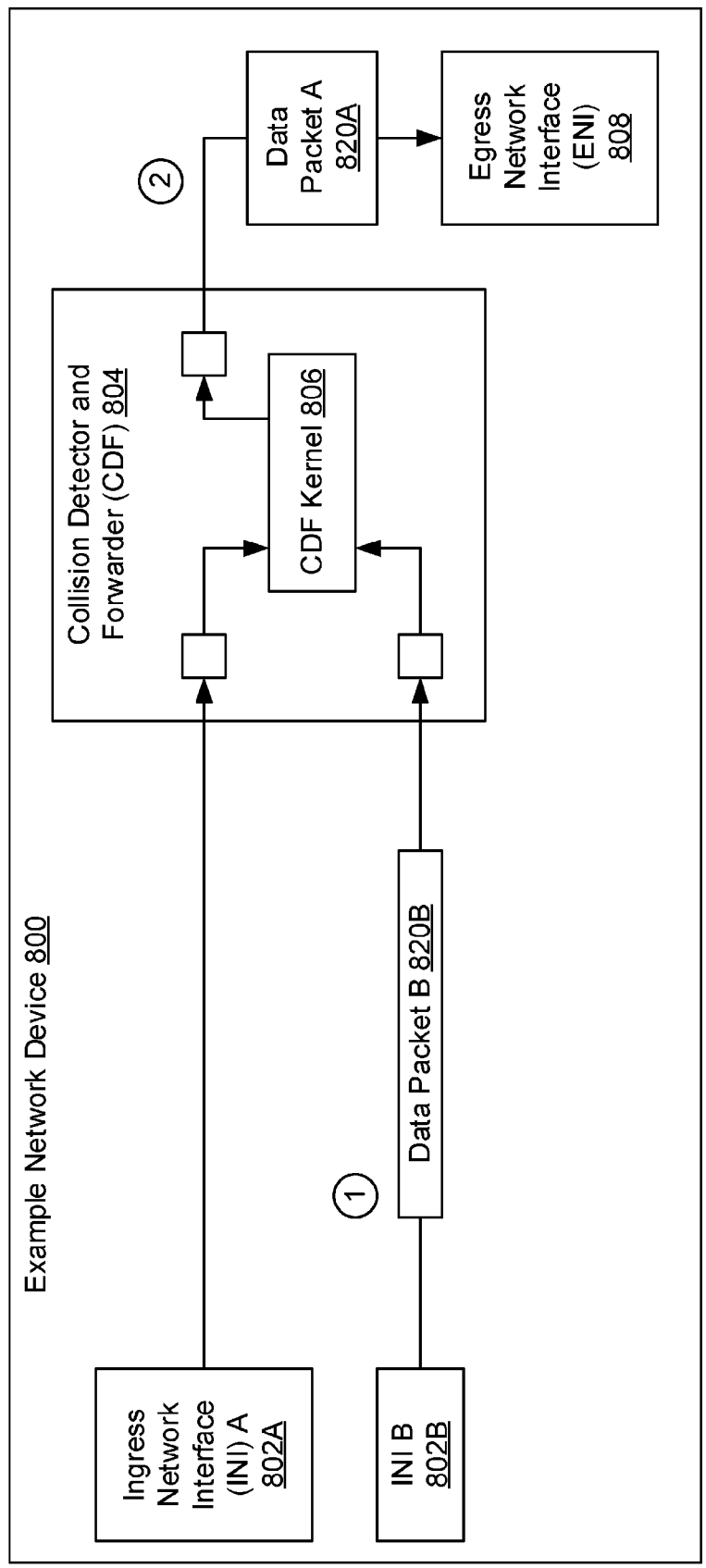
Figure 8E:
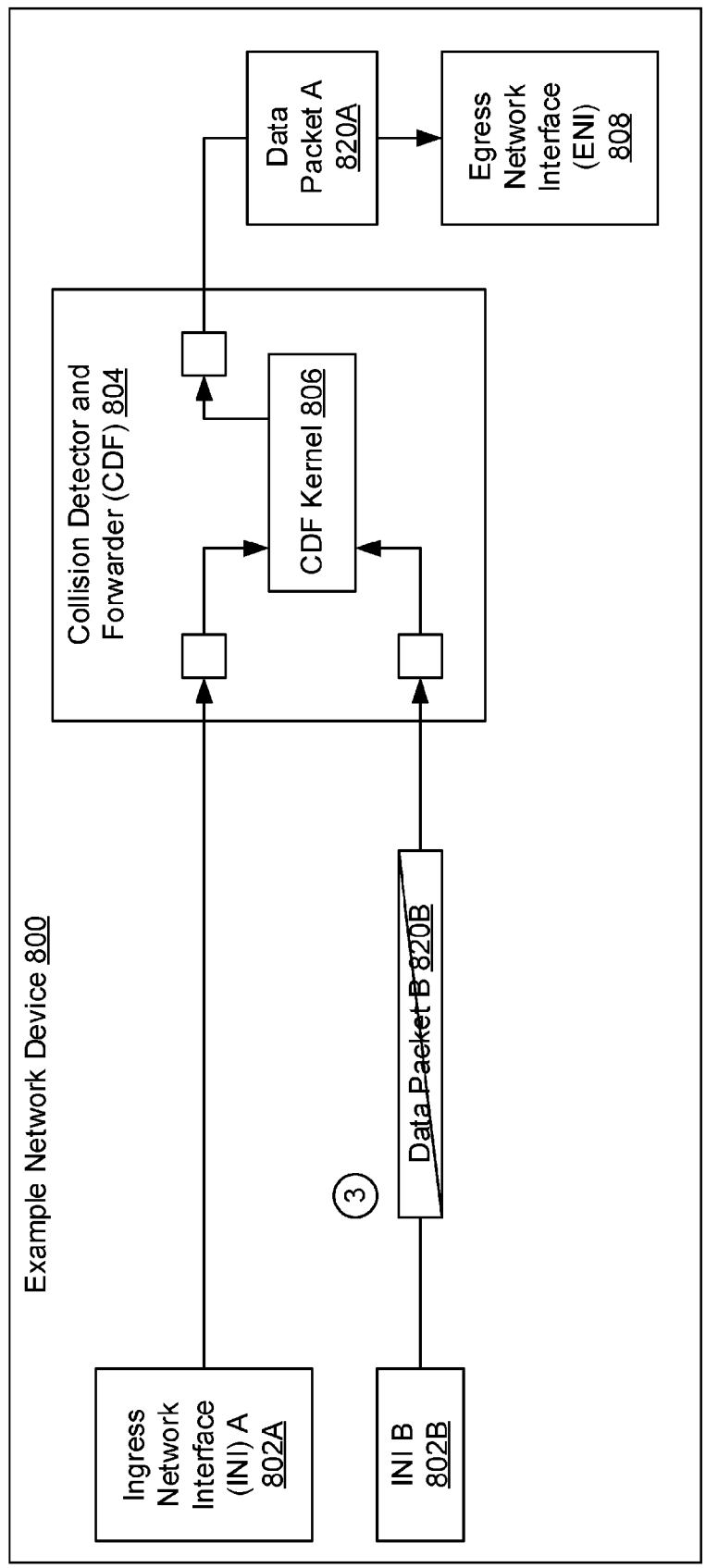

For this scenario, consider FIGS. 8D and 8E in view of the enumerated annotations therein. Turning to FIG. 8D, (1) the CDF (804) receives a second new data packet (820B) arriving through the second INI (802B). In response to receiving the second new data packet (820B), (2) the CDF (804) queries whether it is busy forwarding another (i.e., previously received) data packet through the ENI (808)—thus determining that it is busy still forwarding the first data packet (820A). Subsequently, turning to FIG. 8E, based on the aforementioned determination, (3) the CDF (804) discards the second new data packet (820B).

Example Scenario A-3

Figure 8F:
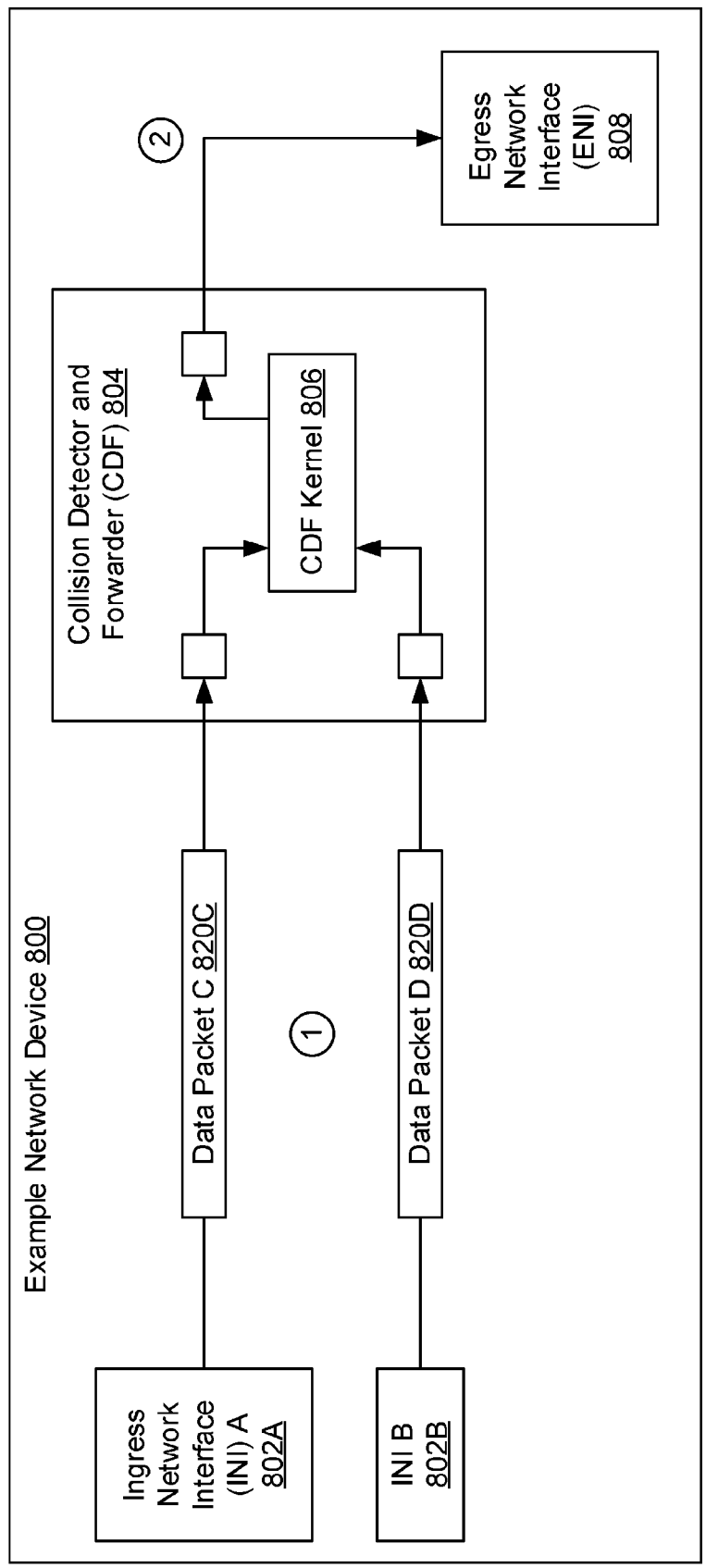
Figure 8G:
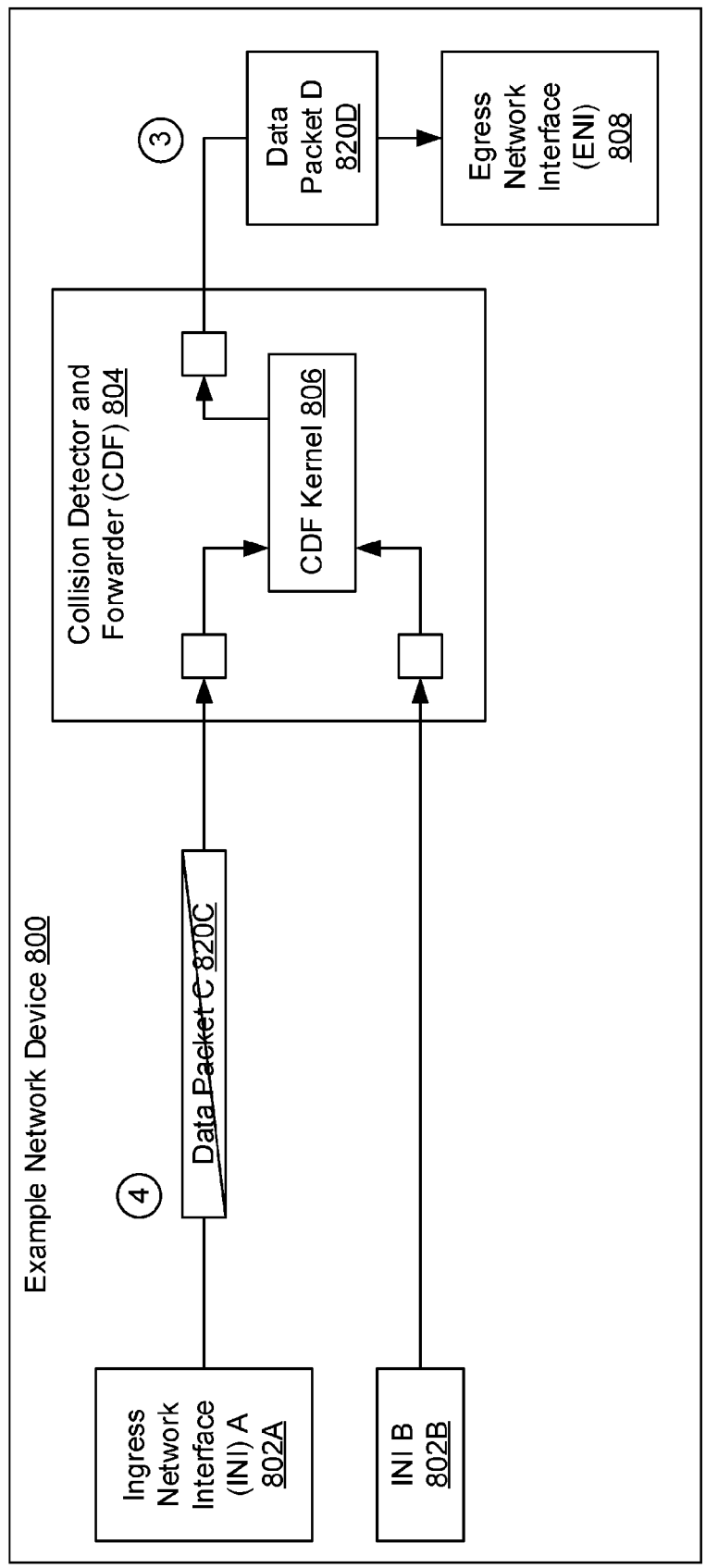

For this scenario, consider FIGS. 8F and 8G in view of the enumerated annotations therein. Turning to FIG. 8F, (1) the CDF (804) receives a third new data packet (820C) arriving through the first INI (802A) and a fourth new data packet (820D) arriving through the second INI (802B). Through the simultaneous arrival of two new data packets (820C, 820D), a data packet collision is detected. In response to receiving the third and fourth new data packets (820C, 820D) and/or the detection of a data packet collision, (2) the CDF (804) queries whether it is busy forwarding another (i.e., previously received) data packet through the ENI (808)—thus determining it is not busy. Subsequently, turning to FIG. 8G, based on the aforementioned determination: (3) the CDF (804) selects the fourth new data packet (820D) to forward through the ENI (808) based on a priority policy; and, furthermore, (4) the CDF (804) discards the third new data packet (820C).

FIGS. 9A-9J show an example network device executing various example scenarios in accordance with one or more embodiments of the invention. The following example scenarios, presented in conjunction with components shown in FIGS. 9A-9J, are for explanatory purposes only and not intended to limit the scope of the invention.

Figure 9A:
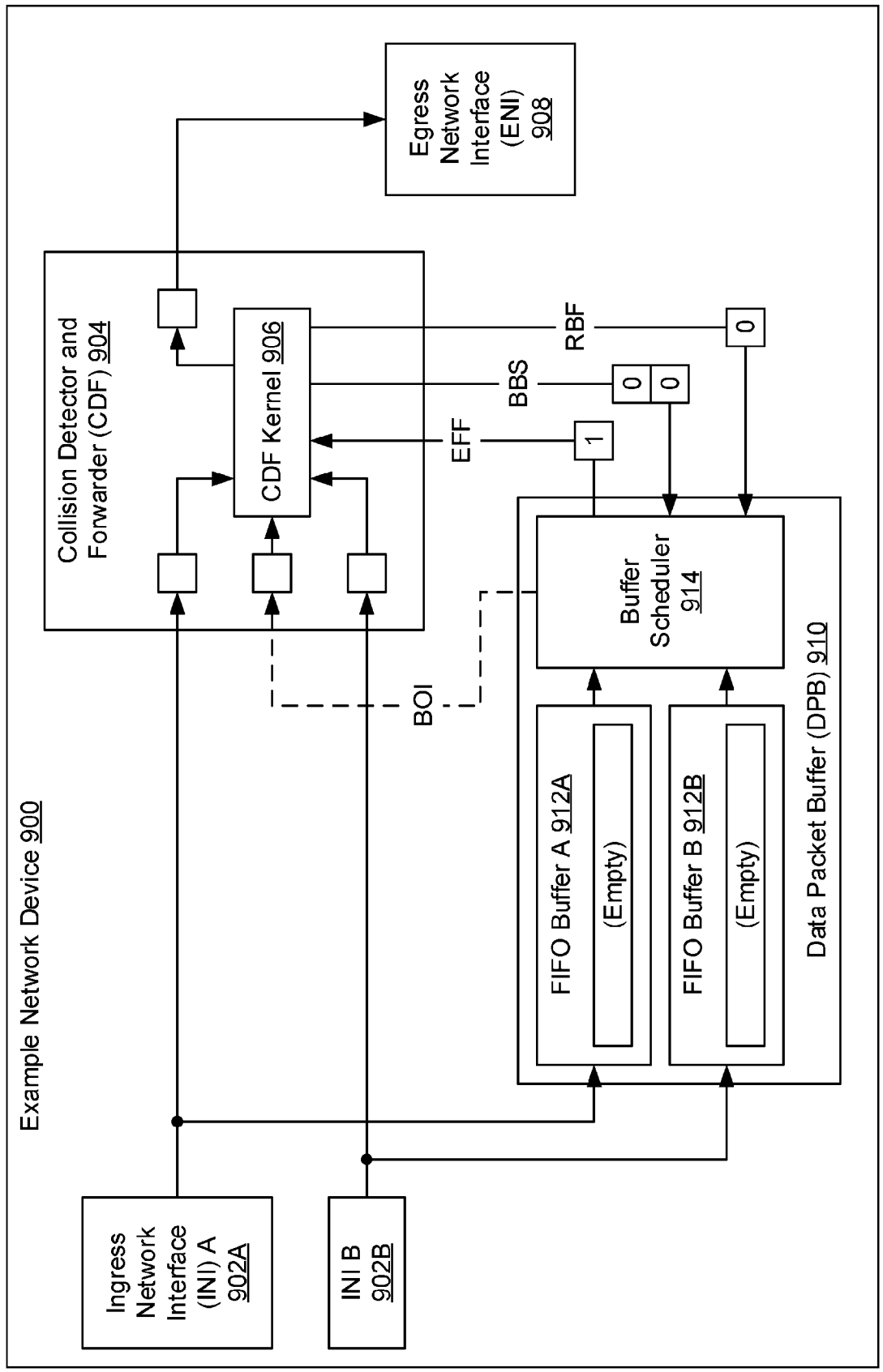
FIGS. 9A-9J show an example network device executing various example scenarios in accordance with one or more embodiments of the invention.

FIG. 9A, the example network device (900) resembles the network device configuration portrayed in FIG. 1B. Accordingly, the example network device (900) includes multiple physical network interfaces, including two ingress network interfaces (INIs) (902A, 902B) and an egress network interface (ENI) (908). Each of the INIs (902A, 902B) feeds into a collision detector and forwarder (CDF) (904), whose actions may be governed by a CDF kernel (906). The CDF (904) and/or CDF kernel (906) is/are connected to the ENI (908), through which data packets may be forwarded. Further, each INI (902A, 902B) also feeds into a data packet buffer (DPB) (910), whose actions may be governed by a buffer scheduler (914). The DPB (910) further includes a separate first-in first-out (FIFO) memory buffer (912A, 912B) for each INI (902A, 902B), respectively.

Example Scenario B-1

Figure 9B:
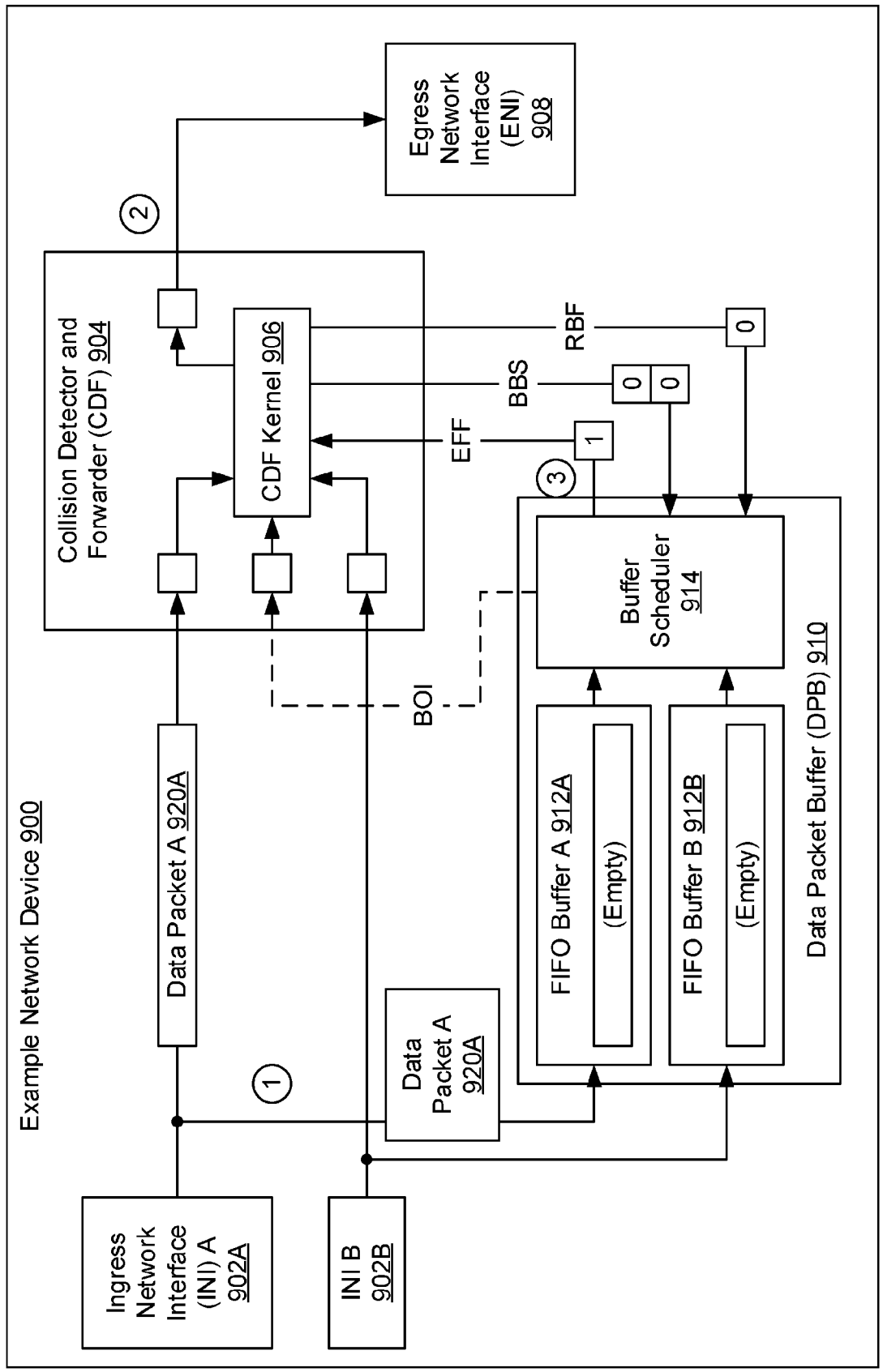
Figure 9C:
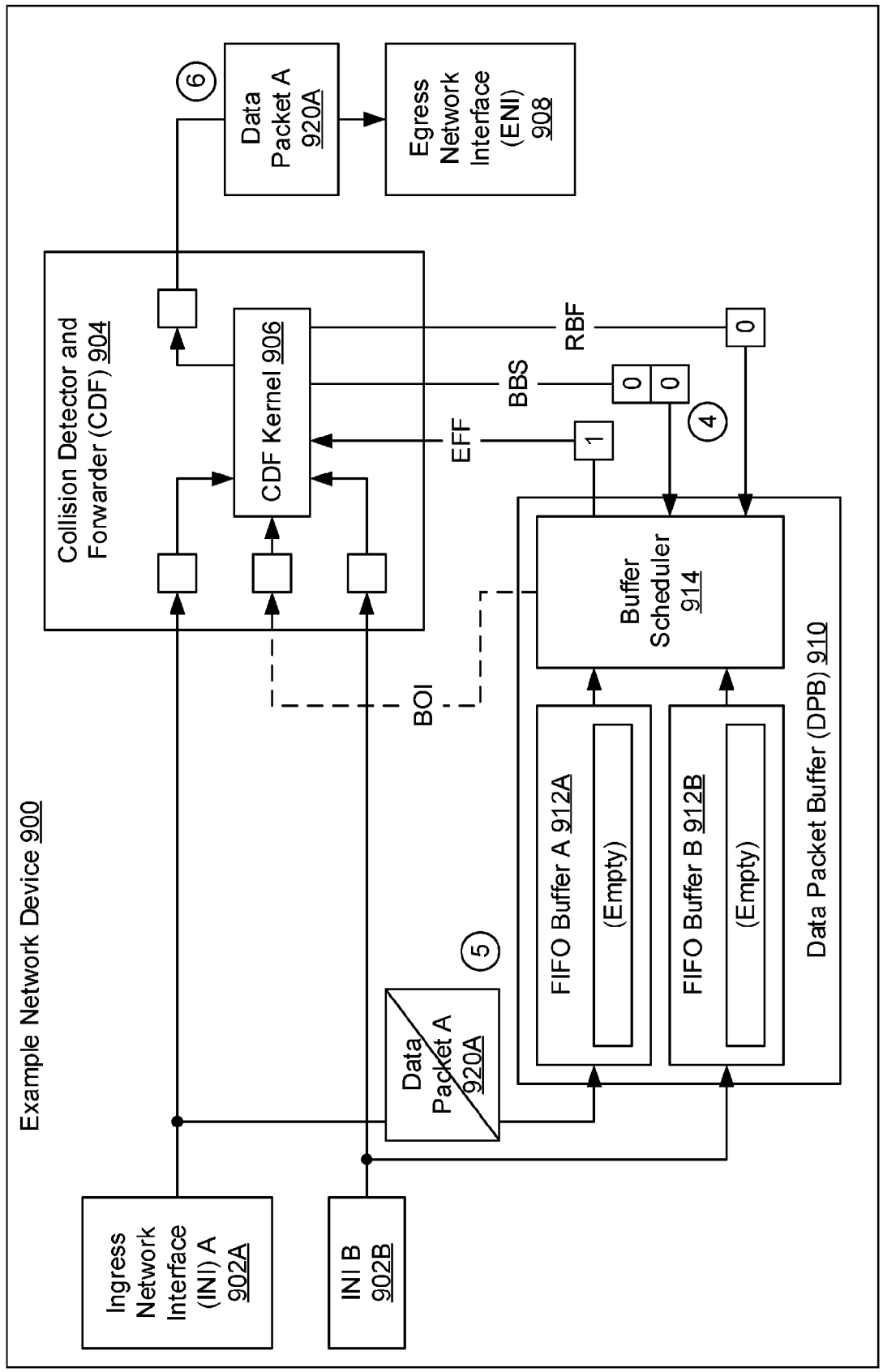

For this example scenario, consider FIGS. 9B and 9C in view of the enumerated annotations therein. Turning to FIG. 9B, (1) both the CDF (904) and the DPB (910) receive a first new data packet (920A) arriving through the first INI (902A). In response to receiving the first new data packet (920A), (2) the CDF (904) queries whether it is busy forwarding another (i.e., previously received) data packet through the ENI (808)—thus determining it is not busy. Following the aforementioned determination, (3) the CDF (904) checks the status of the empty feedback flag (EFF)—thus determining that the EFF is set/enabled, indicating that the DPB (910) is empty. Subsequently, turning to FIG. 9C, based on the aforementioned determinations, (4) the CDF (904) issues a busy bit string (BBS) to the DPB (910), instructing the DPB (910) to discard its received copy of the first new data packet (i.e., the first new data packet copy) (920A). Upon receiving the BBS, (5) the DPB (910) discards the first new data packet copy (920A). Thereafter, (6) the CDF (904) proceeds to forward the first new data packet (920A) through the ENI (908).

Example Scenario B-2

Figure 9D:
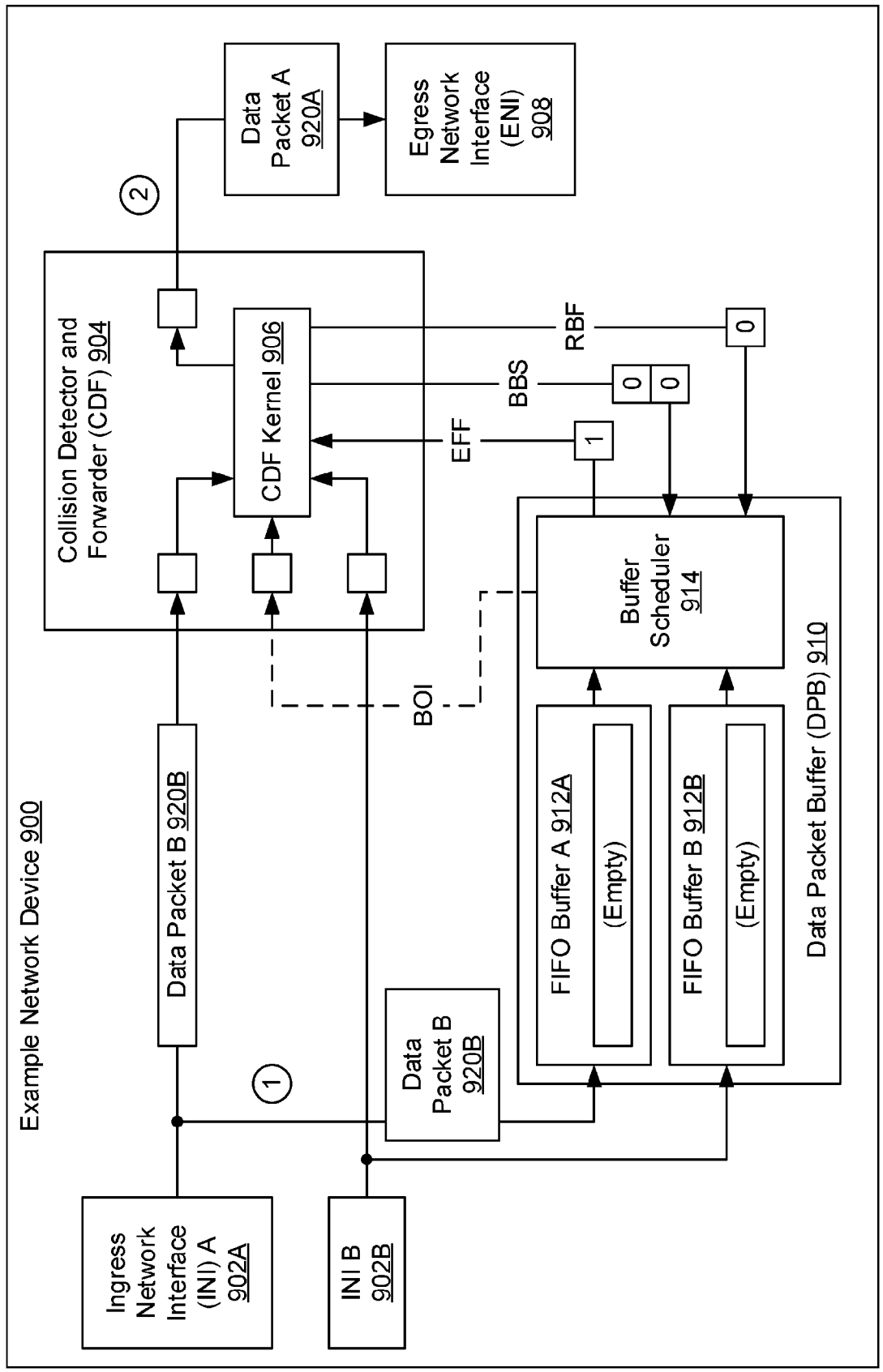
Figure 9E:
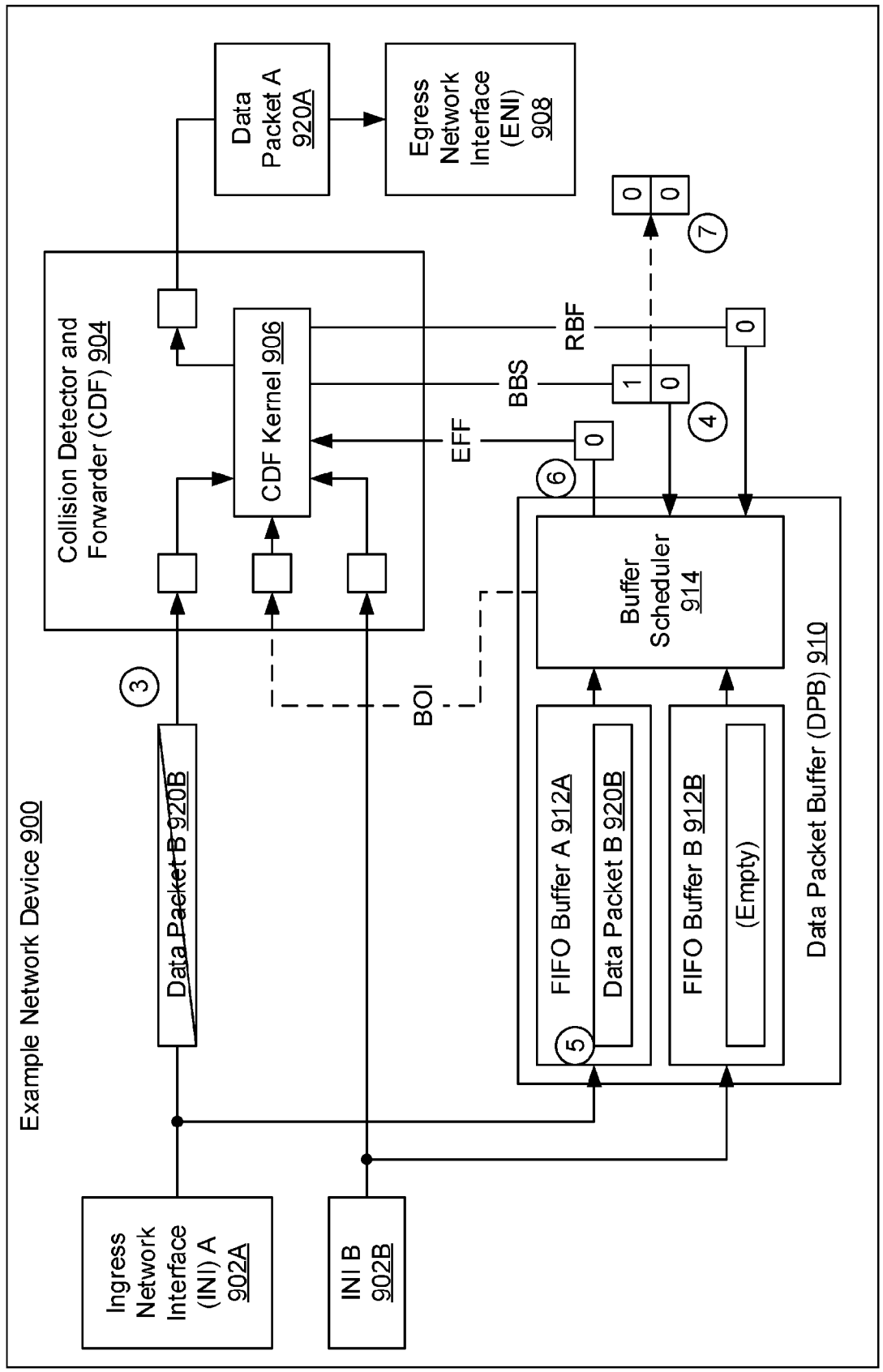

For this example scenario, consider FIGS. 9D and 9E in view of the enumerated annotations therein. Turning to FIG. 9D, (1) both the CDF (904) and the DPB (910) receive a second new data packet (920B) arriving through the first INI (902A). In response to receiving the second new data packet (920A), (2) the CDF (904) queries whether it is busy forwarding another (i.e., previously received) data packet through the ENI (908)—thus determining that it is busy still forwarding the first data packet (920A). Turning to FIG. 9E, following this determination, (3) the CDF (904) discards the second new data packet (920B) that it had received. Following this, (4) the CDF (904) issues a BBS to the DPB (910), instructing the DPB (910) to buffer the second new data packet copy (920B) that the DPB (910) has received. Upon receiving the BBS, (5) the DPB (910) buffers or writes the second new data packet copy (920B) into the first FIFO memory buffer (912A). With the second new data packet copy (920B) stored therein, (6) the DPB (910) updates the empty feedback flag (EFF) to reflect that the DPB (910) is not empty. Thereafter, (7) either the DPB (910) or the CDF (904) resets the BBS.

Example Scenario B-3

Figure 9F:
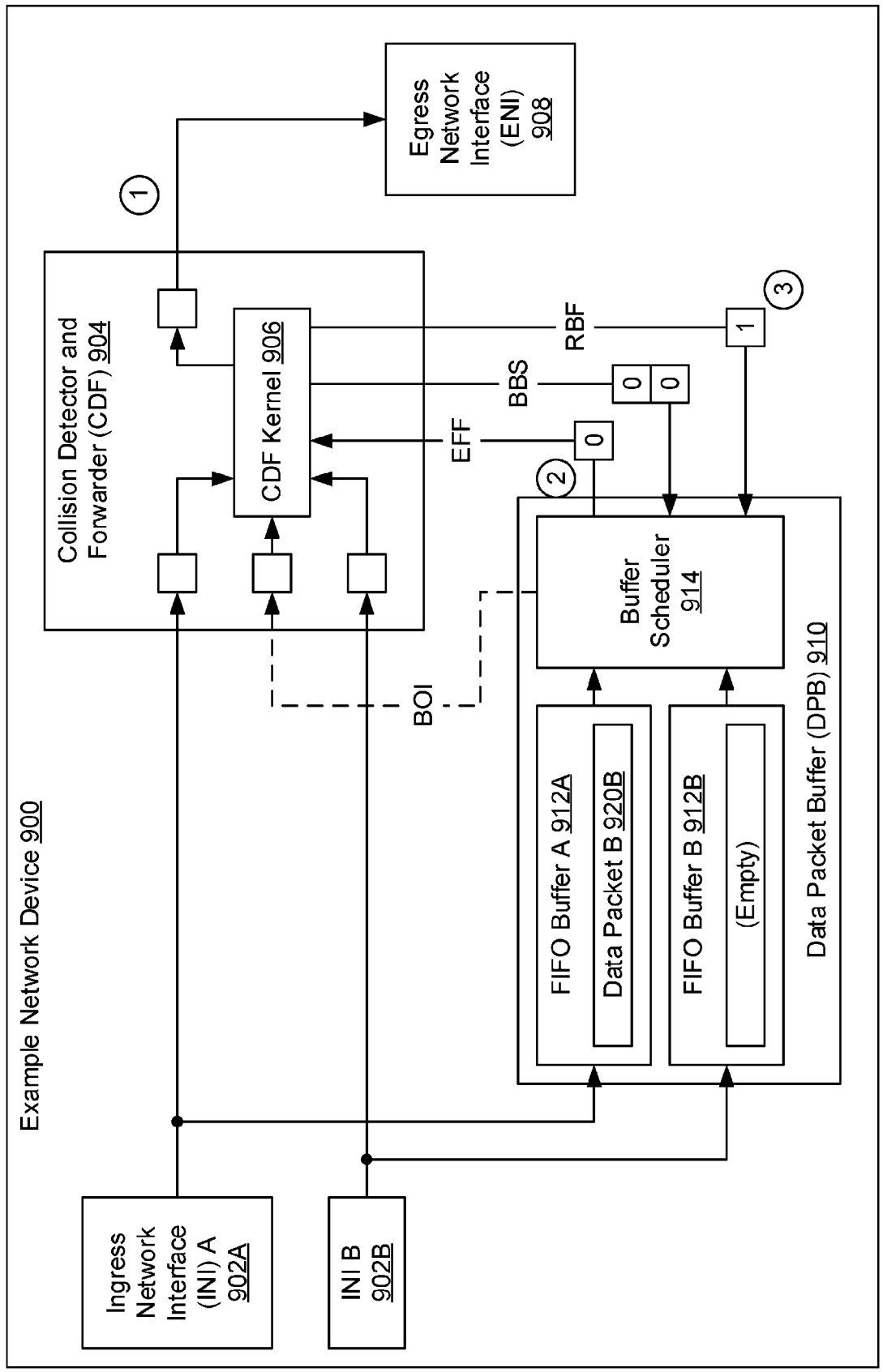
Figure 9G:
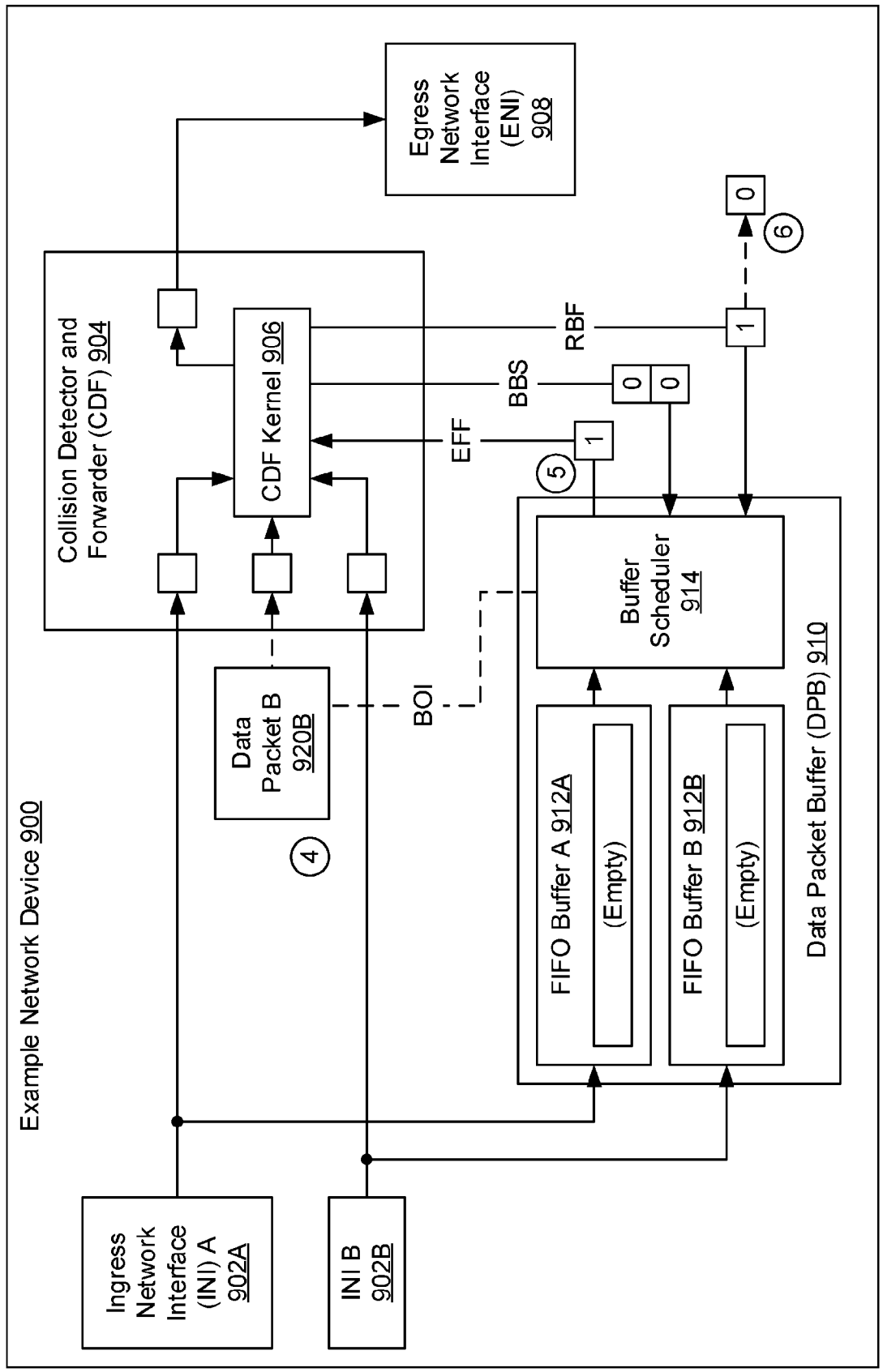
Figure 9H:
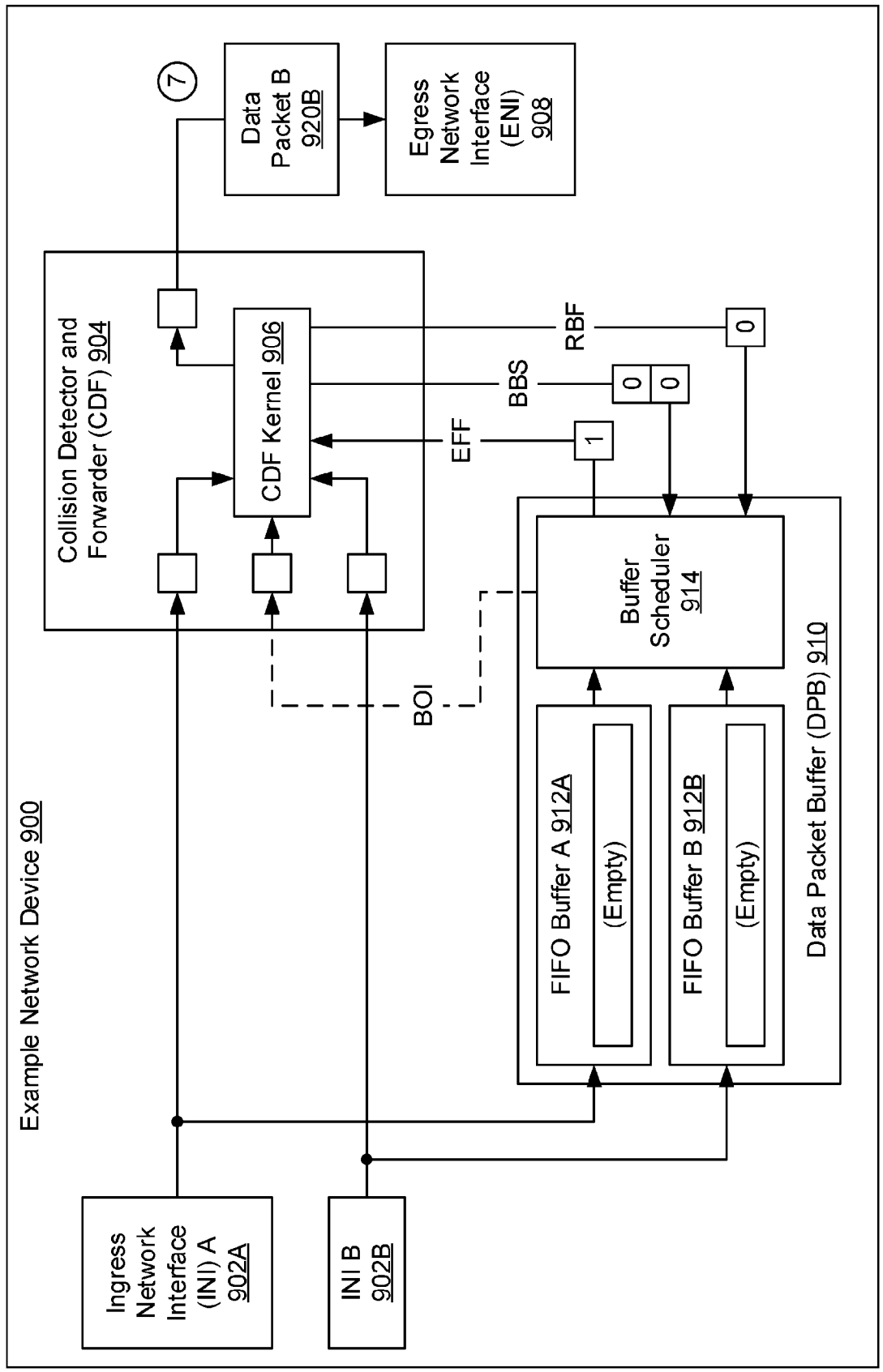

For this example scenario, consider FIGS. 9F-9H in view of the enumerated annotations therein. Turning to FIG. 9F, (1) the CDF (904) detects and determines that it has finished forwarding a data packet (e.g., the first new data packet (920A) (see e.g., FIG. 9E)). Following this determination, (2) the CDF (904) checks the status of the empty feedback flag (EFF)—thus determining that the EFF is clear/disabled, indicating that the DPB (910) is not empty. Subsequently, based on this determination, (3) the CDF (904) updates the read buffer flag (RBF) to reflect that the CDF (904) awaits a buffered data packet from the DPB (910). Turning to FIG. 9G, upon noticing the update to the RBF, (4) the DPB (910) retrieves a buffered data packet (i.e., the second new data packet copy (920B)) from a priority policy selected non-empty FIFO memory buffer (i.e., the first FIFO memory buffer (912A)) and provides the buffered data packet (920B) to the CDF (904) via the buffer output interface (BOI). With the emptying of the first FIFO memory buffer (912A), (5) the DPB (910) updates the empty feedback flag (EFF) to reflect that the DPB (910) is empty. Thereafter, (6) either the DPB (910) or the CDF (904) resets the RBF. Turning to FIG. 9H, upon receiving the buffered data packet (920B) from the DPB (910), (7) the CDF (904) forwards the buffered data packet (920B) through the ENI (908).

Example Scenario B-4

Figure 9I:
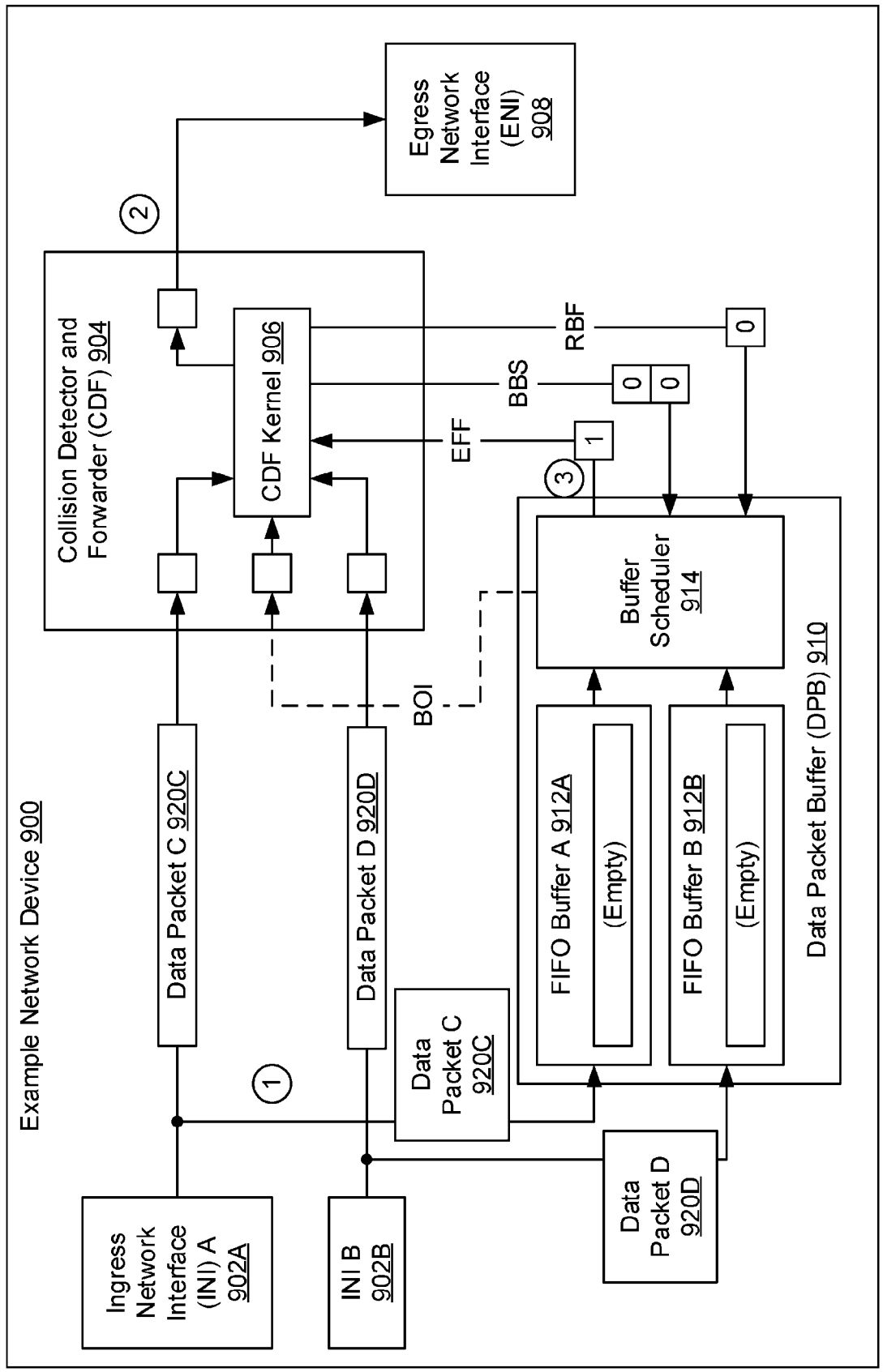
Figure 9J:
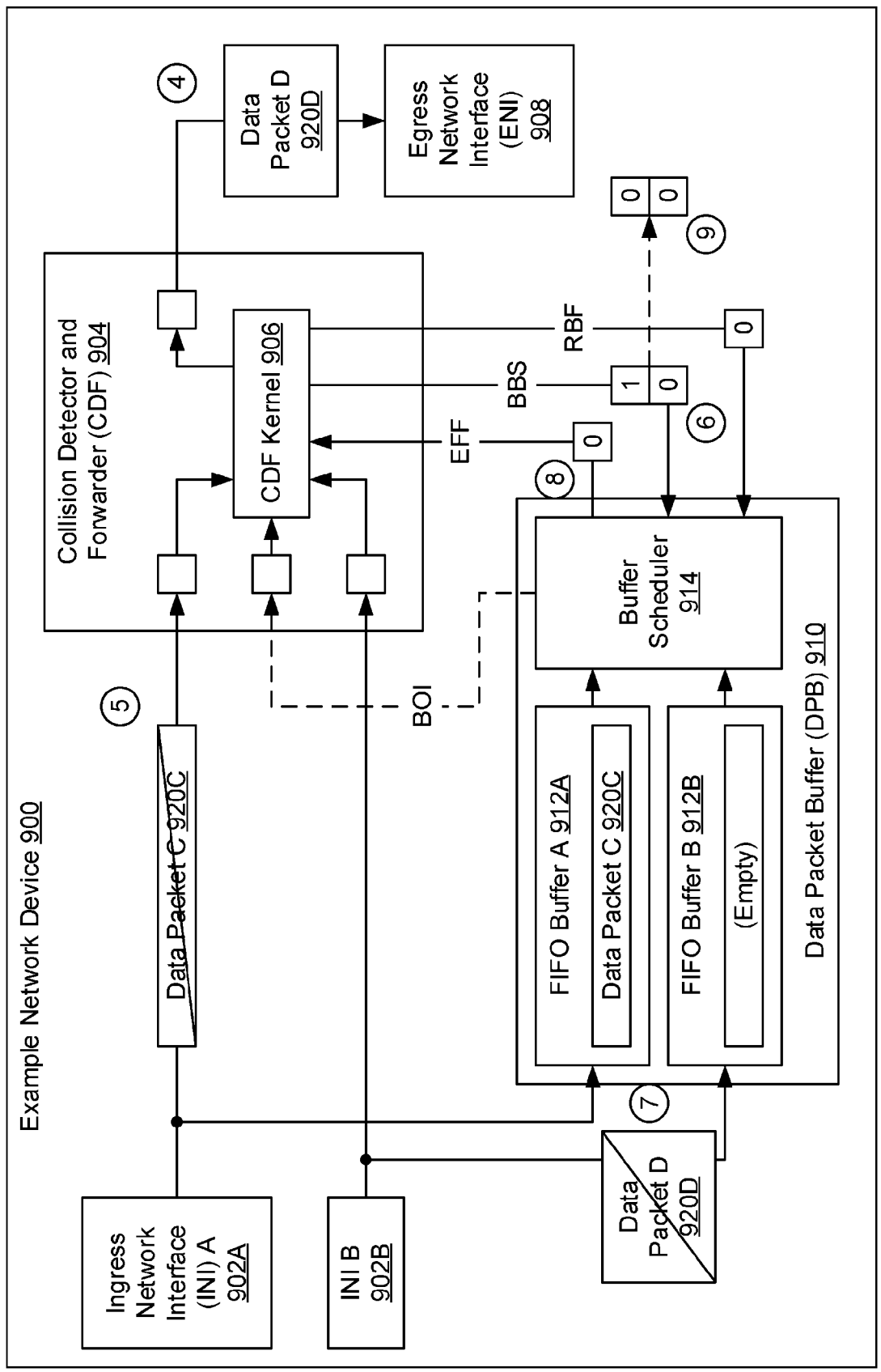

For this example scenario, consider FIGS. 9I and 9J in view of the enumerated annotations therein. Turning to FIG. 9I, (1) both the CDF (904) and the DPB (910) receive a third new data packet (920C) arriving through the first INI (902A) and a fourth new data packet (920D) arriving through the second INI (902B). Through the simultaneous arrival of two new data packets (920C, 920D), a data packet collision is detected. In response to receiving the third and fourth new data packets (920C, 920D) and/or the detection of a data packet collision, (2) the CDF (904) queries whether it is busy forwarding another (i.e., previously received) data packet through the ENI (908)—thus determining it is not busy. Next, the CDF (904) checks the status of the empty feedback flag (EFF)—thus determining that the EFF is set/enabled, indicating that the DPB (910) is empty. Subsequently, turning to FIG. 9J, based on the aforementioned determinations: (4) the CDF (904) selects the fourth new data packet (920D) to forward through the ENI (908) based on a priority policy; and, furthermore, (5) the CDF (904) discards the third new data packet (920C) that the CDF (904) has received. Following this, (6) the CDF (904) issues a BBS to the DPB (910), instructing the DPB (910) to buffer the third new data packet copy (920C), while discarding the fourth new data packet copy (920D), that the DPB (910) has received. Upon receiving the BBS, (7) the DPB (910) buffers or writes the third new data packet copy (920C) into the first FIFO memory buffer (912A) and discards the fourth new data packet copy (920D). With the third new data packet copy (920C) stored therein, (8) the DPB (910) updates the EFF to reflect that the DPB (910) is not empty. Thereafter, (9) either the DPB (910) or the CDF (904) resets the BBS.

Embodiments of the invention relate to a method and network device for forwarding data packets. Specifically, the method and network device disclosed herein introduces a dual component data packet forwarding architecture, which replaces the known single component data packet forwarding architecture. More specifically, the functionalities of (a) forwarding received data packets, and (b) buffering received data packets, once performed by a single component, has been segmented into two components—i.e., the CDF and the DPB—which may still work in tandem. Under the previous single component data packet forwarding architecture, all or most arriving data packets are often automatically buffered and, then, later forwarded. The buffering of all or most data packets greatly increases the latency observed for the process of forwarding the data packets out of the network device.

Accordingly, embodiments of the invention address the above-mentioned data packet forwarding problem through the separation and optimization of the forwarding and buffering functionalities. That is, in one or more embodiments of the invention, when a data packet collision has not transpired, received data packets may be permitted to pass through the network device (without buffering), thereby eliminating the latency associated with the buffering of data packets. Further, in one or more other embodiments of the invention, when a data packet collision does transpire, minimal latency may be introduced through selective buffering of certain (but not all or most) received data packets. The efficient buffering of selective data packets, followed by the efficient clearing of the buffered backlog of data packets, also optimize the output bandwidth of the network device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forwarding data packets, comprising:
receiving, by a collision detector and forwarder (CDF), a first data packet arriving through a first ingress network interface (INI) and a second data packet arriving through a second INI;
receiving, by a data packet buffer (DPB), a first data packet copy arriving through the first INI and a second data packet copy arriving through the second INI;
selecting, by the CDF, the first data packet based on a first priority policy;
forwarding, based on the selecting, the first data packet through an egress network interface (ENI) while discarding the second data packet; and
buffering, by the DPB, the second data packet copy while discarding the first data packet copy.

2. The method of claim 1, wherein the first priority policy is a forwarding prioritization rule for selecting a data packet over at least one other data packet based on times of arrival of the data packet and the at least one other data packet.

3. The method of claim 1, further comprising:
prior to the selecting, by the CDF, of the first data packet based on the first priority policy:
detecting, by the CDF, a data packet collision between the first data packet and the second data packet; and
selecting the first data packet, based on the first priority policy, in response to detecting the data packet collision.

4. The method of claim 3, wherein detecting, by the CDF, the data packet collision comprises determining that at least a portion of the first data packet temporally overlaps at least a portion of the second data packet.

5. The method of claim 1, further comprising:
prior to the selecting, by the CDF, of the first data packet based on the first priority policy:
making a determination, by the CDF, that the CDF is not busy forwarding a third data packet, wherein the third data packet had been previously received; and
selecting the first data packet, based on the first priority policy, in response to the determination.

6. The method of claim 1, further comprising:
prior to the selecting, by the CDF, of the first data packet based on the first priority policy:
making a determination, by the CDF, that the DPB is empty; and
selecting the first data packet, based on the first priority policy, in response to the determination.

7. The method of claim 6, wherein making the determination, by the CDF, that the DPB is empty comprises obtaining a status of an empty feedback flag (EFF), wherein the EFF is updated by the DPB based on a collective state of a plurality of first-in, first-out (FIFO) memory buffers.

8. The method of claim 1, further comprising:
prior to the buffering, by the DPB, of the second data packet copy and the discarding of the first data packet copy:
generating, by the CDF, a busy bit string (BBS) comprising a buffer instruction or a discard instruction, for each INI of a plurality of INIs comprising the first INI and the second INI;
issuing the BBS to the DPB; and
receiving and processing, by the DPB, the BBS to at least buffer the second data packet copy and discard the first data packet copy.

9. The method of claim 1, wherein the buffering, by the DPB, of the second data packet copy comprises storing the second data packet copy in a first-in, first-out (FIFO) memory buffer operatively connected and dedicated to the second INI.

10. The method of claim 1, further comprising:
making a first determination, by the CDF, that the first data packet has finished forwarding through the ENI;
making a second determination, based on the first determination, that the DPB is not empty;
receiving, from the DPB and through a buffer output interface (BOI), the second data packet copy; and
forwarding the second data packet copy through the ENI.

11. The method of claim 10, further comprising:
prior to receiving, by the CDF, the second data packet copy from the DPB and through the BOI:
notifying the DPB, by the CDF, that the CDF awaits a buffered data packet;
selecting, by the DPB and in response to the notifying, the second data packet copy as the buffered data packet based on a second priority policy; and
providing the second data packet copy to the CDF through the BOI.

12. The method of claim 11, wherein notifying the DPB, by the CDF, that the CDF awaits the buffered data packet comprises updating a read buffer flag (RBF), wherein the RBF is monitored by the DPB.

13. The method of claim 11, wherein the second priority policy is a retrieval prioritization rule for selecting a data packet over at least one other data packet based on buffering times of the data packet and the at least one other data packet.

14. The method of claim 10, further comprising:
receiving, by the CDF, a third data packet arriving through a third INI;
making a third determination that the second data packet copy has finished forwarding through the ENI;
making a fourth determination that the DPB is empty;
based at least on the third and fourth determinations:
forwarding, by the CDF, the third data packet through the ENI; and
discarding, by the DPB, a third data packet copy received by the DPB through the third INI.

15. The method of claim 10, further comprising:
receiving, by the CDF, a third data packet arriving through a third INI;
making a third determination that the second data packet copy has not finished forwarding through the ENI;
based at least on the third determination:
discarding, by the CDF, the third data packet; and
buffering, by the DPB, a third data packet copy received by the DPB through the third INI.

16. The method of claim 15, wherein buffering, by the DPB, of the third data packet copy comprises storing the third data packet copy in a first-in, first-out (FIFO) memory buffer operatively connected and dedicated to the third INI.

17. A network device, comprising:
a plurality of network interfaces comprising a set of ingress network interfaces (INIs) and an egress network interface (ENI);
a collision detector and forwarder (CDF) operatively connected to the plurality of network interfaces, and programmed to:
receive a first data packet arriving through a first INI of the set of INIs and a second data packet arriving through a second INI of the set of INIs;
select the first data packet based on a first priority policy; and forward, based on the selecting, the first data packet through the ENI while discarding the second data packet; and a data packet buffer (DPB) operatively connected to the set of INIs and the CDF, and programmed to:
  receive a first data packet copy arriving through the first INI of the set of INIs and a second data packet copy arriving through the second INI of the set of INIs;
  receive a busy bit string (BBS) from the CDF after the selection of the first data packet; and
  based on the BBS, buffer the second data packet copy while discarding the first data packet copy.

18. The network device of claim 17, wherein the DPB comprises a set of first-in first-out (FIFO) memory buffers, wherein each FIFO memory buffer of the set of FIFO memory buffers is operatively connected and dedicated to a different INI of the set of INIs.

19. The network device of claim 17, wherein the network device is a switch, a router, or a multilayer switch.

* * * * *